(12) United States Patent
Fedayev et al.

(10) Patent No.: US 11,301,271 B1
(45) Date of Patent: Apr. 12, 2022

(54) CONFIGURABLE REPLACEMENTS FOR EMPTY STATES IN USER INTERFACES

(71) Applicant: ServiceNow, Inc., Santa Clara, CA (US)

(72) Inventors: Alexander Fedayev, Petah Tikva (IL); Maor Cohen, Petah Tikva (IL); Bezalel Bar-Eli, Petah Tikva (IL); Sean Andrew Bradley Bowrin, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/154,289

(22) Filed: Jan. 21, 2021

(51) Int. Cl.
G06F 9/451 (2018.01)
G06F 12/0866 (2016.01)
G06F 16/438 (2019.01)
G06F 8/38 (2018.01)

(52) U.S. Cl.
CPC ............... *G06F 9/451* (2018.02); *G06F 8/38* (2013.01); *G06F 12/0866* (2013.01); *G06F 16/438* (2019.01)

(58) Field of Classification Search
CPC ........ G06F 9/451; G06F 8/38; G06F 12/0866; G06F 16/438
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| 5,237,518 A | 8/1993 | Sztipanovits et al. |

(Continued)

FOREIGN PATENT DOCUMENTS

| | | |
|---|---|---|
| EP | 0433979 | 6/1991 |
| EP | 1607824 | 12/2005 |
| WO | WO 99/34285 | 7/1999 |
| WO | WO 00/52559 | 9/2000 |
| WO | WO 01/79970 | 10/2001 |

OTHER PUBLICATIONS

"Everything you need to know about empty state design," Justinmind, https://www.justinmind.com/blog/everything-you-need-to-know-about-empty-state-design/, Jul. 12, 2018.

*Primary Examiner* — Pei Yong Weng

(74) *Attorney, Agent, or Firm* — McDonnell Boehnen Hulbert & Berghoff LLP

(57) ABSTRACT

Persistent storage may contain a view template and a view configuration, wherein the view template specifies an arrangement of placeholders for graphical user interface components, wherein the view configuration specifies the graphical user interface components for the arrangement, and wherein the graphical user interface components include one or more image components, text components, or button components. One or more processors may be configured to: receive a request; retrieve data from the persistent storage; determine that the data specifies that no results responsive to the request are available; determine that an empty state is defined for when no results responsive to the request are available; generate replacement content for the empty state, wherein the replacement content includes the view template with references to at least one of the image components, text components, or button components overwriting the placeholders; and transmit, in a reply to the request, the replacement content.

20 Claims, 19 Drawing Sheets

(56) References Cited

U.S. PATENT DOCUMENTS

| | | |
|---|---|---|
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,954,904 B2 | 10/2005 | White |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,555,707 B1 * | 6/2009 | Labarge ............ G06F 40/143 |
| | | 715/234 |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Fee et al. |
| 8,458,605 B2 | 6/2013 | Klask et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 8,762,870 B2 | 6/2014 | Robotham et al. |
| 9,053,460 B2 | 6/2015 | Gilbert et al. |
| 9,098,555 B2 | 8/2015 | Bjork et al. |
| 10,079,730 B2 | 9/2018 | Subramanian et al. |
| 2002/0059204 A1 * | 5/2002 | Harris .............. G06F 16/24522 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2010/0318538 A1 * | 12/2010 | Wyman ............... G06F 16/3349 |
| | | 707/759 |
| 2012/0016706 A1 | 1/2012 | Pargaonkar et al. |
| 2015/0012513 A1 * | 1/2015 | Ou ...................... G06F 16/951 |
| | | 707/706 |
| 2016/0125011 A1 * | 5/2016 | Petschulat ............ G06F 16/20 |
| | | 707/722 |
| 2018/0365873 A1 * | 12/2018 | Prophete ............... G06T 13/80 |

\* cited by examiner

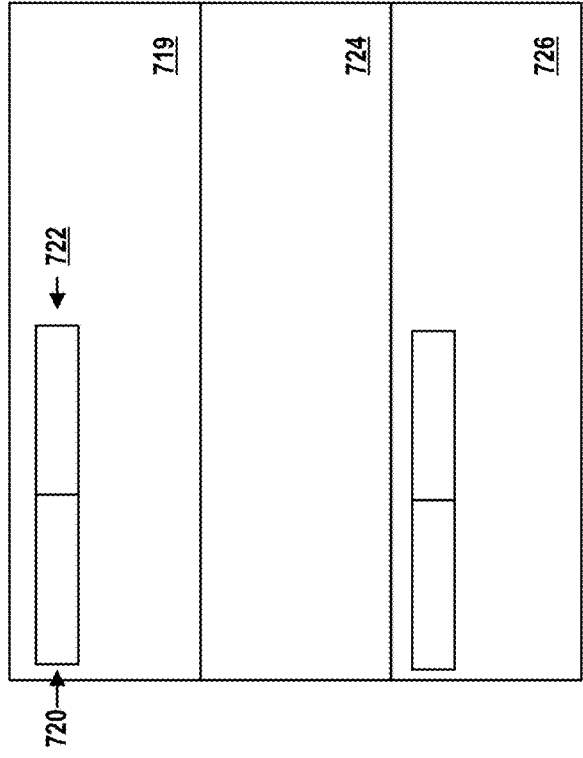
FIG. 7B
FIG. 7C
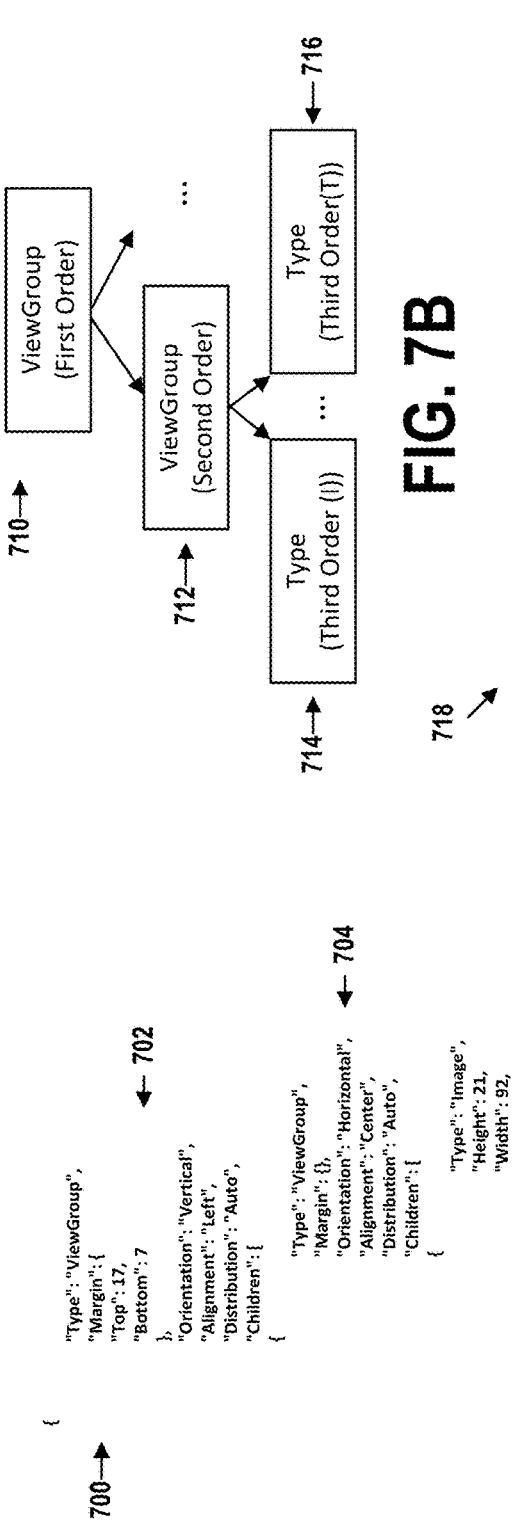
FIG. 7A

FIG. 11A

```
{
"Type": "ViewGroup",
"Margin": { "Top": 10, "Bottom": 10 },
"Orientation": "Horizontal",
"Alignment": "Center",
"Distribution": "Auto",
"Children": [
    {
    "Type": "ViewGroup",
    "Orientation": "Vertical",
    "Alignment": "Center",
    "Distribution": "Auto",
    "Children": [
        {
        "type": "Image",
        "CornerRadius": 50,
        "Height": 100,
        "Width": 100,
        "Margin": { "Top": 10, "Bottom": 10 },
        "CellId": "IMAGESLOT1",
        "Id": "IMAGESLOT1"
        },
        {
        "type": "Text",
        "Margin": { "Top": 0 },
        "Textcolor": "#1f8476",
        "TextAlignment": "CENTER",
        "MaxLines": 1,
        "Font": {
            "Weight": "regular",
            "Size": 12
        },
        "Width": 100,
        "CellId": "TEXTSLOT1",
        "Id": "TEXTSLOT1"
        }
    ],
    "Margin": {},
    "Width": 350
    }
]
}
```
← 1100

FIG. 11B

```
{
"Type": "ViewGroup",
"Margin": { "Top": 10, "Bottom": 10 },
"Orientation": "Horizontal",
"Alignment": "Center",
"Distribution": "Auto",
"Children": [
    {
    "Type": "ViewGroup",
    "Orientation": "Vertical",
    "Alignment": "Center",
    "Distribution": "Auto",
    "Children": [
        {
        "type": "Text",
        "Margin": { "Top": 0 },
        "Textcolor": "#1f8476",
        "TextAlignment": "CENTER",
        "MaxLines": 1,
        "Font": {
            "Weight": "regular",
            "Size": 12
        },
        "Width": 100,
        "CellId": "TEXTSLOT2",
        "Id": "TEXTSLOT2"
        }
    ],
    "Margin": {},
    "Width": 350
    }
]
}
```
← 1102

CONFIGURABLE REPLACEMENTS FOR EMPTY STATES IN USER INTERFACES

BACKGROUND

Various types of user interface components, such as screens or segments within such screens, may have an empty state from time to time. Examples of empty states could be when no results are returned by a search, there are no entries in a list of items, or there otherwise is no particular content defined for a component to display. But current implementations of empty states have significant drawbacks. First, an empty state is typically represented on the user interface as a blank area, perhaps with a simple message such as "no results found" or "no items available". Second, in most cases, empty states are statically configured (e.g., hard-coded) into the application to which the user interface belongs. Other disadvantages of conventional empty state implementations may exist.

SUMMARY

The embodiments herein overcome these and potentially other limitations by allowing the definition of replacement content for empty states. This replacement content may include not only text, but various arrangements of text, images, and/or user interface widgets (e.g., buttons, menus, sliders, toggles, etc.). Further, replacement content may be dynamically configured based on the graphical user interface (GUI) component in which it appears and/or a point in the workflow of the application in which the user interface component appears. This workflow state can change in real time.

Advantageously, this allows the replacement content to notify the user of certain general global actions or actions specific to workflow state that can be taken when no content would otherwise be provided, or at least inform the user that no content is available in a clearer and more lucid fashion. Further, the replacement content can be customized based on the context of the user's interaction with the application. For example, a system may define default replacement content for various types of user interface components. The system may allow an administrator to override this default replacement content with specific replacement content for particular user interface components.

Moreover, these embodiments may be implemented as part of a native, data-driven mobile application that dynamically requests and receives data that defines content and arrangements thereof from a server device. Based on requests and possibly other information, the server device may provide replacement content and arrangements thereof for display in accordance with the configuration and abilities of the mobile application.

As a result, these embodiments provide the application designer with more flexibility, functionality, and control over application layout and content. Also, the user experience can be more consistent, with familiar text and icons for replacement content used in similar ways throughout an application.

Accordingly, a first example embodiment may involve persistent storage containing a view template and a view configuration, wherein the view template specifies an arrangement of placeholders for graphical user interface components, wherein the view configuration specifies the graphical user interface components for the arrangement, and wherein the graphical user interface components include one or more image components, text components, or button components. The first example embodiment may also involve one or more processors configured to: receive, from a client device, a request; in response to receiving the request, retrieve data from the persistent storage; determine that the data specifies that no results responsive to the request are available; determine that an empty state is defined for when no results responsive to the request are available; generate replacement content for the empty state, wherein the replacement content includes the view template with references to at least one of the image components, text components, or button components overwriting the placeholders; and transmit, in a reply to the request, the replacement content.

A second example embodiment may involve receiving, by a computing device and from a client device, a request, wherein persistent storage contains a view template and a view configuration, wherein the view template specifies an arrangement of placeholders for graphical user interface components, wherein the view configuration specifies the graphical user interface components for the arrangement, and wherein the graphical user interface components include one or more image components, text components, or button components. The second example embodiment may also involve, perhaps in response to receiving the request, retrieving, by the computing device, data from the persistent storage. The second example embodiment may also involve determining, by the computing device, that the data specifies that no results responsive to the request are available. The second example embodiment may also involve determining, by the computing device, that an empty state is defined for when no results responsive to the request are available. The second example embodiment may also involve generating, by the computing device, replacement content for the empty state, wherein the replacement content includes the view template with references to at least one of the image components, text components, or button components overwriting the placeholders. The second example embodiment may also involve transmitting, by the computing device and in a reply to the request, the replacement content.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A is a structured data format encoding a hierarchical GUI, in accordance with example embodiments.

FIG. 7B depicts a hierarchy of GUI elements, in accordance with example embodiments.

FIG. 7C depicts hierarchical GUI, in accordance with example embodiments.

FIGS. 11A and 11B depict representations of view templates, in accordance with example embodiments.

DETAILED DESCRIPTION

Figure 1:
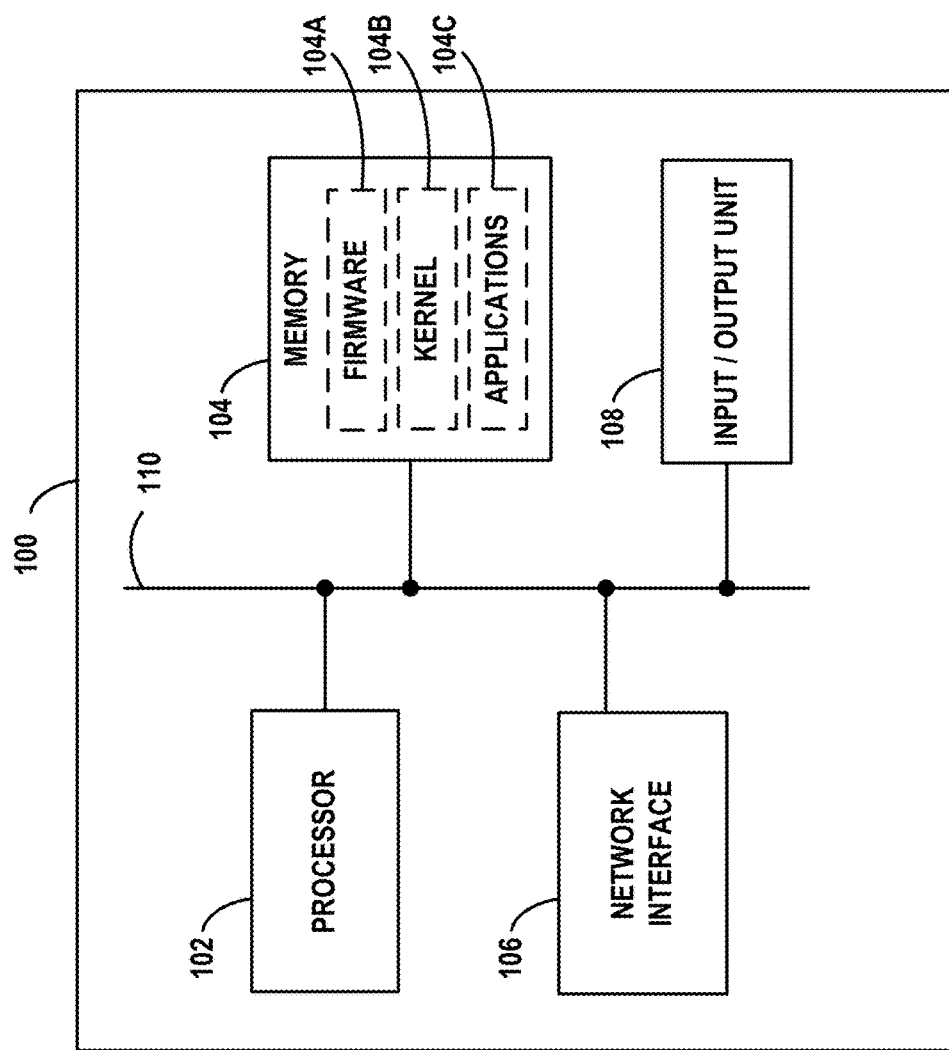
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
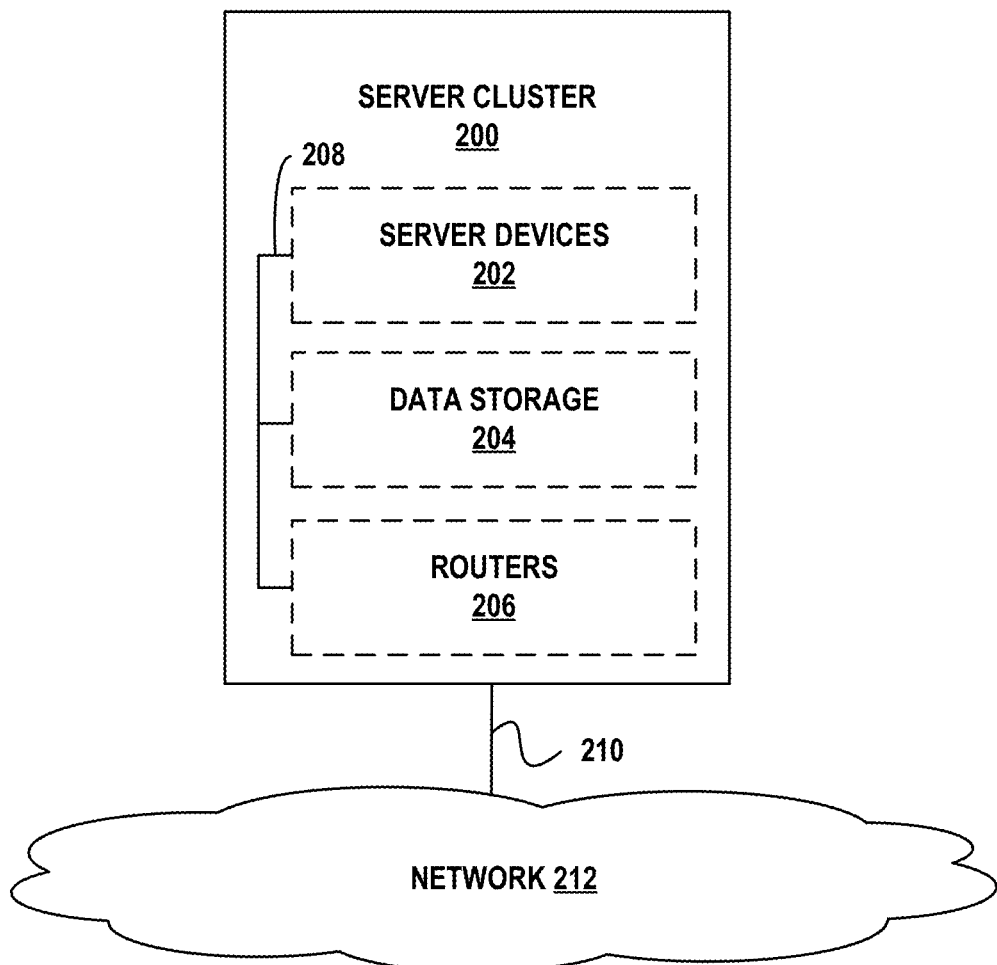
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
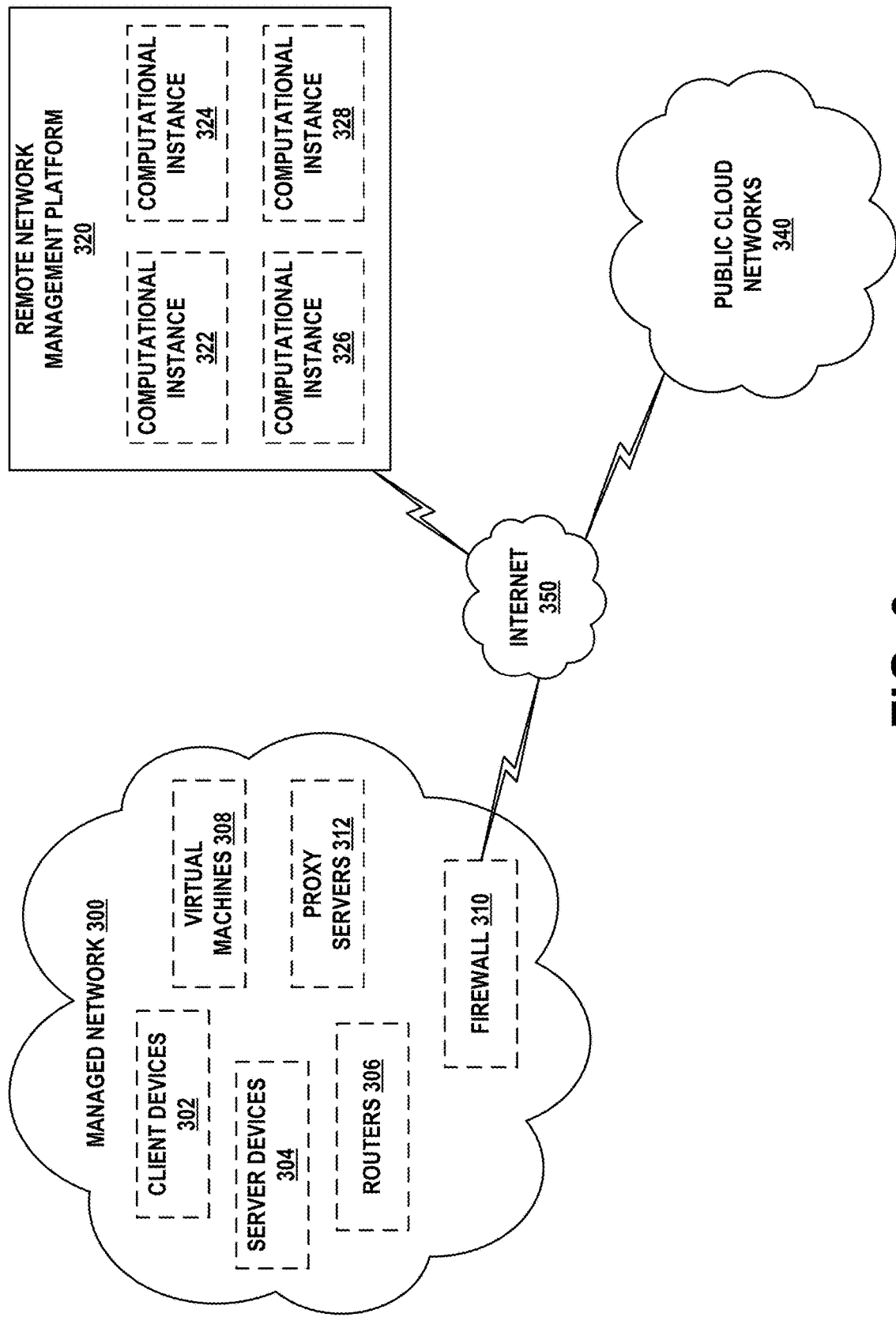
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
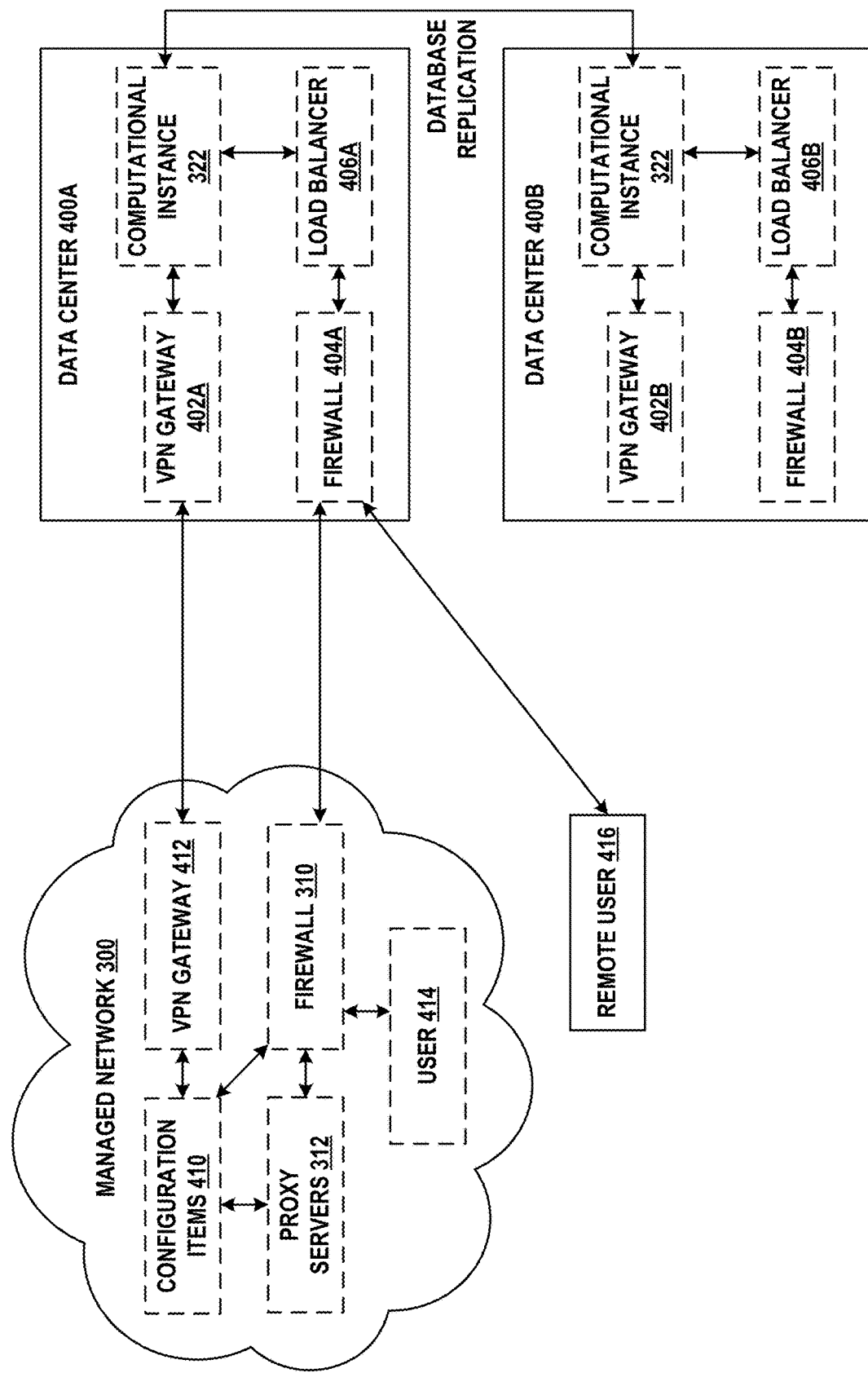
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
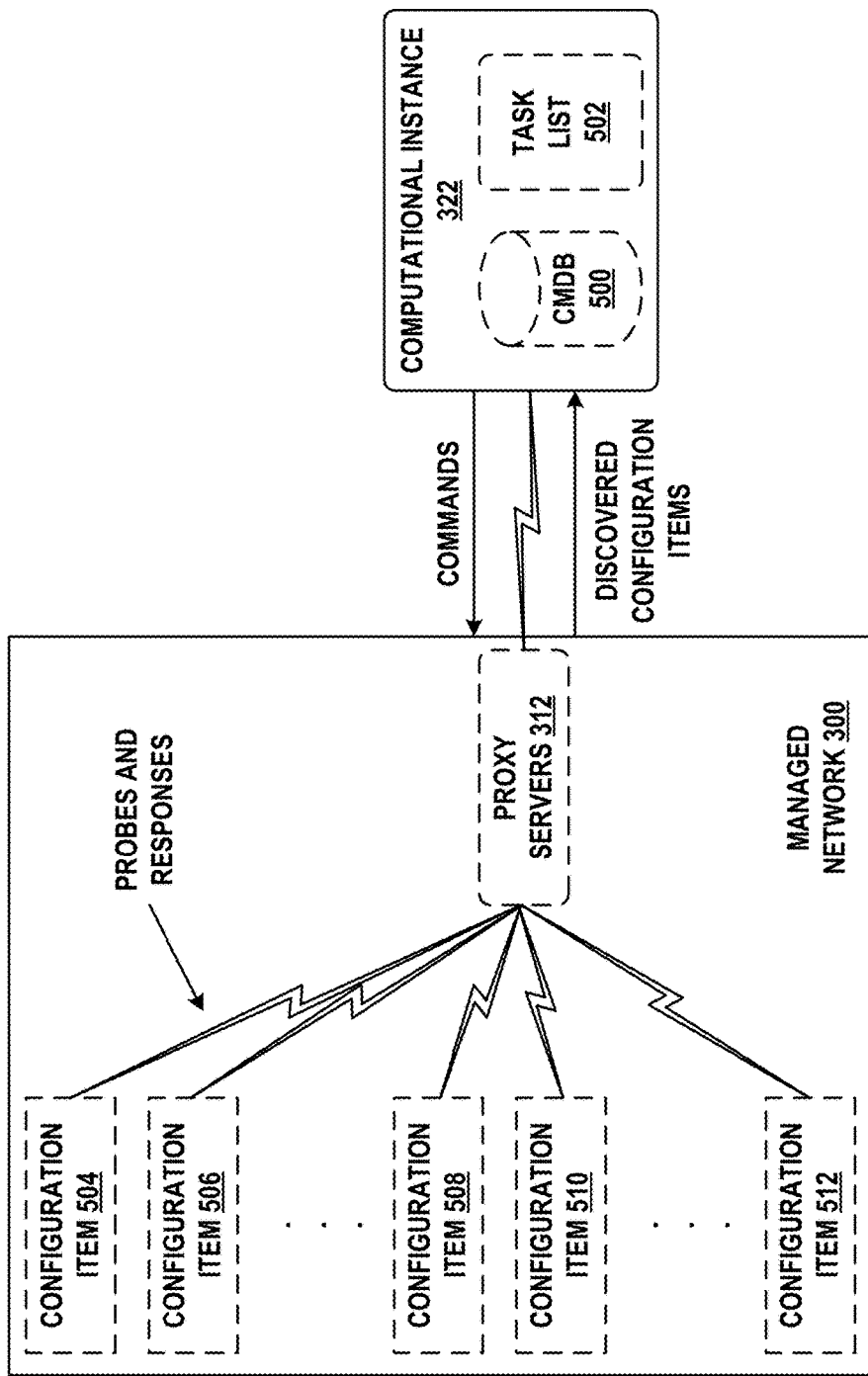
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain particular information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
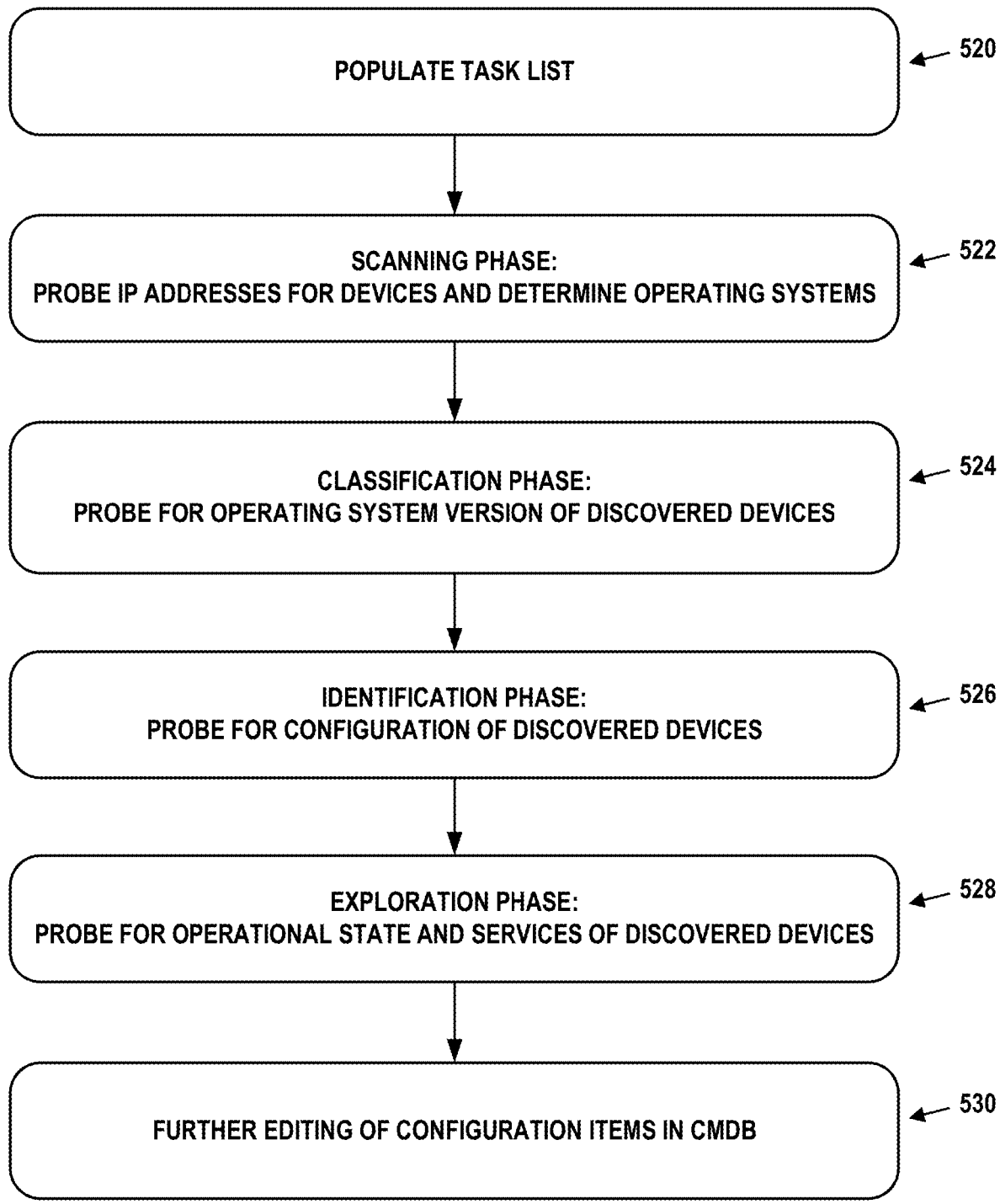
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Mobile Application Framework

The embodiments herein involve dynamically configurable replacement content used when an application would otherwise display, within a GUI screen or segment thereof, data representing an empty state. While these embodiments are not limited to use with mobile applications, this section provides an overview of an example mobile application framework that is particularly well-suited for supporting the embodiments. Other frameworks may be possible. Thus, the embodiments herein could also be used for non-mobile applications and user interfaces, for example desktop applications and user interfaces. Nonetheless, once this framework is introduced, the specific embodiments involving replacement content for empty states will be presented.

A. Mobile Device Content Display Challenges

The use of mobile devices, such as smartphones, smartwatches, tablets, and so on has become ubiquitous. As such, users of a remote network management platform may expect to be able to obtain access thereto from such mobile devices around the clock and from a variety of physical locations. However, at least three issues exist.

First, the relatively small screen size of a mobile device limits the amount of information that can be displayed at any one point in time on the device. For instance, a typical smartphone may have a diagonal screen size of 6-7 inches, whereas a desktop computer may be attached to a monitor with a 30 inch (or more) diagonal screen size. Thus, the amount and type of data displayed at any one point in time may be severely limited on mobile devices as opposed to desktop (or even laptop) computers. Notably, web pages provided by the remote network management platform may display appropriately on a large screen, but might be shrunk to a nearly unreadable size on the screen of a mobile device.

Second, there are many configurations and screen sizes for mobile devices, and an application may render and scale differently across different devices. These differences can be between different mobile devices from the same manufacturer (e.g., a tablet versus a smartphone) or comparable wireless devices from different manufacturers (e.g., two similarly sized smartphones with different button placements). This result is often problematic because it can lead to inconsistent user experiences with an application used across such mobile devices. This problem is increased by the fact that many of these mobile devices also use different versions of a particular operating system or platform, or different operating systems or platforms, altogether. Users of these applications who experience these problems between different mobile devices may be left with inconsistent (potentially frustrating) impressions.

Third, users often interact with certain kinds of mobile devices differently than they would with other devices. For example, a user interacting with a smartphone, smartwatch, tablet, and the like is more inclined to view and interact with the device from multiple angles, often rotating the orientation of the device to suit the user's preference, than with other, more stationary devices (e.g., a television, desktop computer, etc.). However, even when rotating the device, the user may expect to see a seamless continuity of content and the arrangement of that content regardless of the orientation of the device. As discussed above, this expectation may be problematic because it can lead to inconsistent user experiences with an application used across such mobile devices because the application might not only render and scale differently across different devices, but also across different orientations of the same device (e.g., in portrait versus landscape orientation modes). Without this continuity of experience while rotating the device, the user may become frustrated and underutilize the device (e.g., only view content in a portrait mode, even if it is better suited for horizontal viewing), or may stop viewing content on the device altogether.

A mobile application framework is introduced herein helps to address these problems by providing ways to define and configure a native mobile application executing on a mobile device. The native mobile application is compiled or interpreted directly by the mobile device by way of the mobile device's operating system and/or supporting libraries. Unlike a generic web browser or applications that download for execution in a web browser, the native mobile application is designed specifically for communicating with a computational instance of a remote network management platform or another source of data.

By way of this communication, a server device (e.g., of a computational instance) may provide content for display pursuant to a particular arrangement on the mobile device based on instructions that are largely device, platform, and orientation independent. These instructions may arrange and scale the content on the mobile device accordingly (e.g., via a set of instructions detailing a recursively-defined, container-based arrangement of content, regardless of the device). Thus, content and/or its arrangement can be designed to be easily readable even with the limited screen size of the mobile device, no matter what mobile device the content is displayed on, the operating system and/or platform running on that mobile device, or the orientation of that mobile device from the user's perspective.

Furthermore, the native mobile application may be able to determine when the content on the mobile device is modified and responsively take further action. For instance, the native mobile application may detect when a user has modified the content on the mobile device via a displayed user interface. In some cases, the mobile device may determine that it should request further content and instructions for arranging that content in accordance with user interface layout instructions using the native mobile application (e.g., in one or more previously defined containers, rows, etc.).

Along with the content and/or arrangement provided to the mobile device, the native mobile application may update its user interface to reflect changes (e.g., due to navigation to changing values of displayed data) made by a user based on a number of factors. For example, when a user rotates the device (e.g., from portrait to landscape) the native mobile application may respond by maintaining the attributes and proportions of the previously displayed screen, just in a different orientation. Alternatively, the native mobile application may automatically scale the previously-displayed content in a more appropriate or pleasing view based on the rotated orientation (e.g., automatically scale the content that was displayed in portrait view to fit and fill a landscape view). In this way, when the native mobile application determines that the mobile device has changed physical orientation between landscape and portrait orientation modes, it can generate an updated user interface that represents the content spatially organized according to a particular arrangement. Further, because the screen of the mobile device may have different relative dimensions in the landscape and portrait orientation modes, the updated user interface may also contain less or more of the content than the user interface prior to updating.

Additionally, the native mobile application may request, from one or more server devices, further content and arrangements for displaying that updated content based on a set of previously-used and/or previously-defined interactions with the server devices. For example, based on previously displaying content in accordance with an arrangement (e.g., a recursively-defined, container-based arrangement of content), the native mobile application may generate a request for additional content that the mobile device does not have stored locally (e.g., images, text, or both), receive the updated content, and display that content based on instructions that display the updated content similarly to the previous instructions. The result can be a dramatically improved user experience that allows for seamless, adaptive scaling across multiple devices, platforms, and device orientations, all without crowding the local memory and storage of the mobile device.

In addition to these advantages, the user interface layout and content of the native mobile application can easily be modified. Developing native mobile applications for mobile devices requires a high level of skill, and these applications may need to be updated from time to time. The embodiments herein provide intuitive web-based user interfaces through which even a non-technical user can visually define the user interface layout and content of the native mobile application as a hierarchy of containers, images, and text. Thus, the native mobile application can be rapidly adapted to changing enterprise needs without having to rewrite its source code, re-compile it, and/or re-deploy it.

B. Obtaining Displayable Content

Figure 6A:
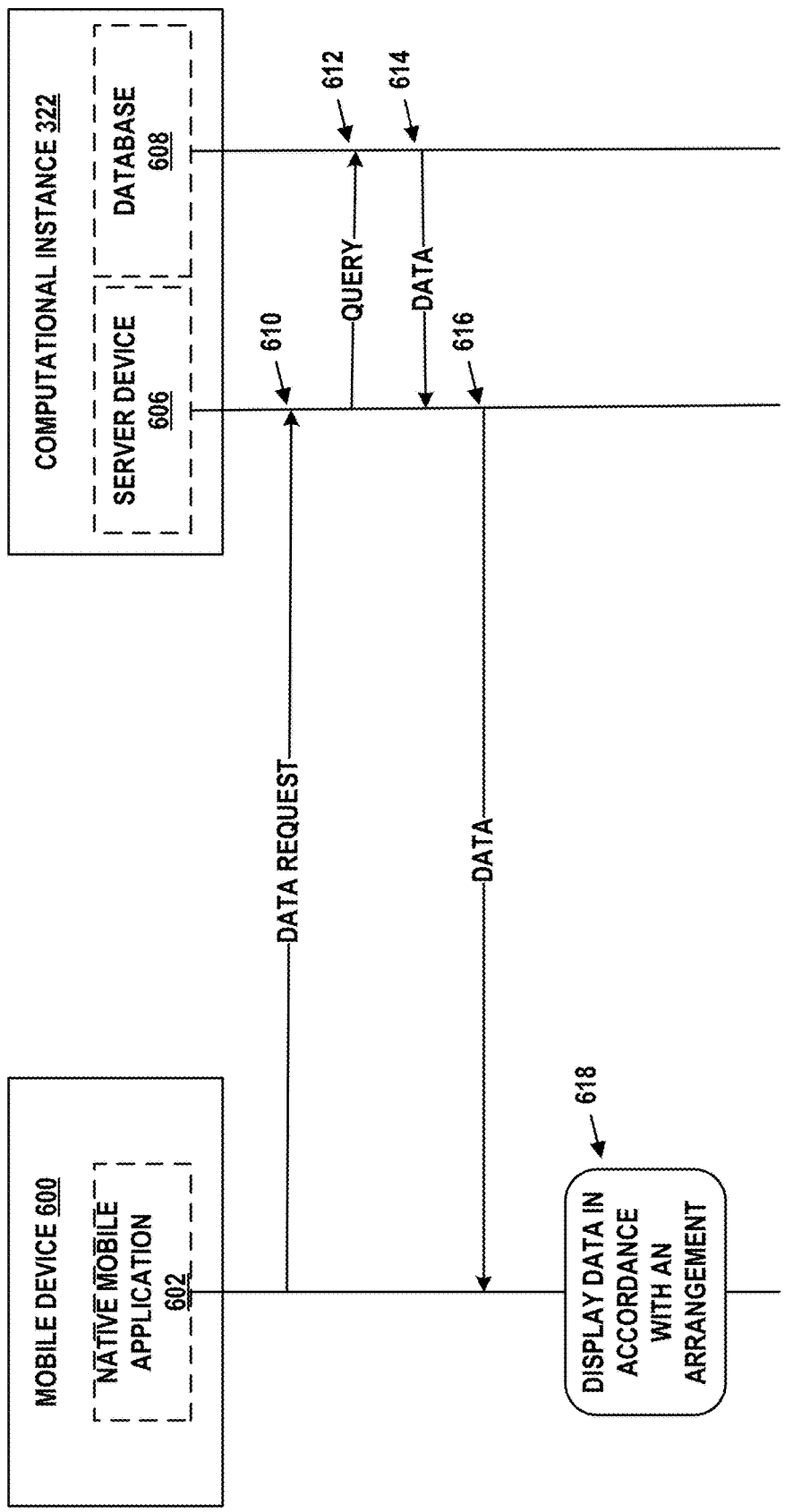
FIG. 6A is a message flow diagram, in accordance with example embodiments.
Figure 6B:
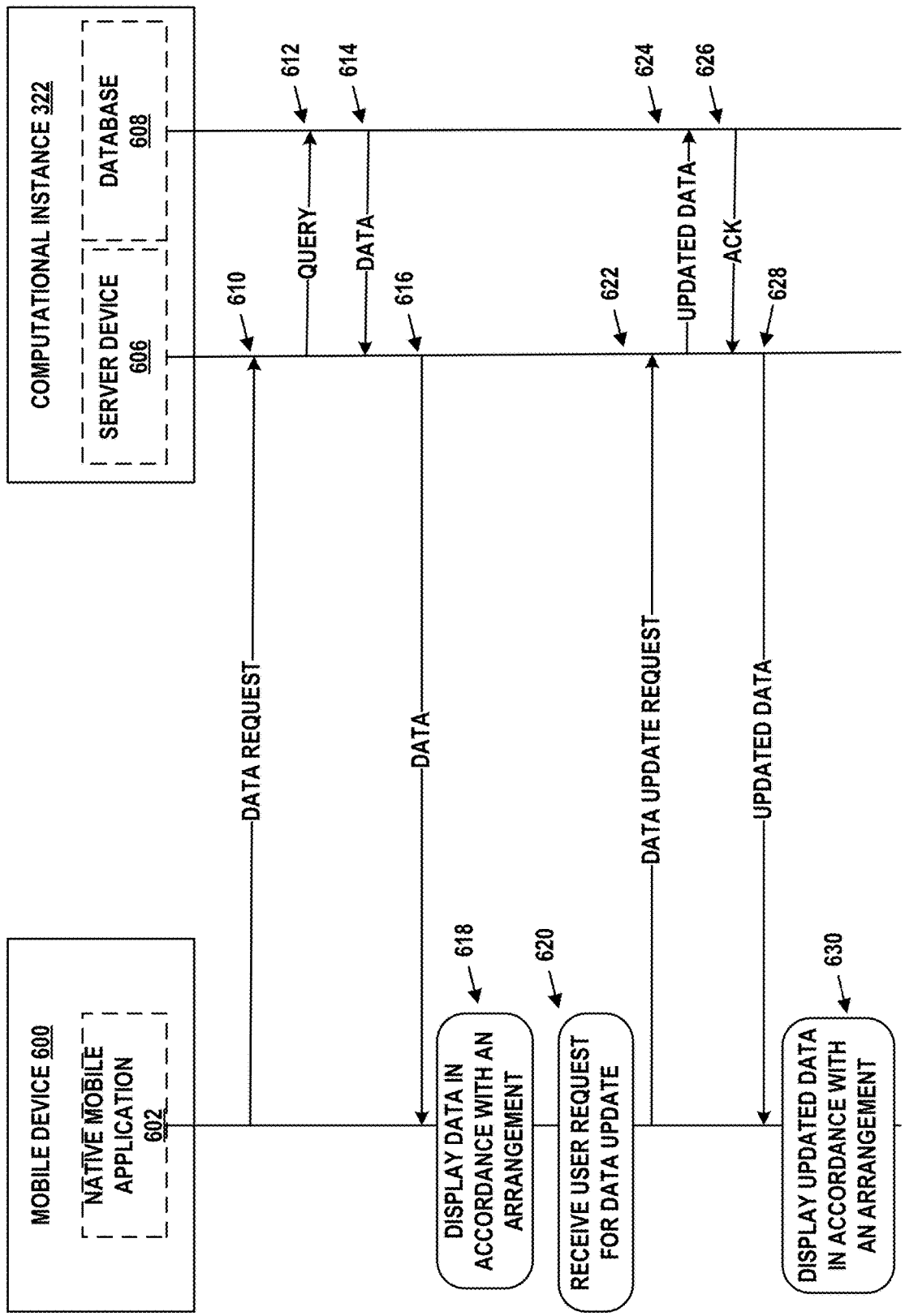
FIG. 6B is a message flow diagram, in accordance with example embodiments.

For sake of comparison, FIG. 6A depicts a transaction between a native mobile application and a server device when a mobile device is executing the native mobile application and displaying content pursuant to a particular arrangement, and then FIG. 6B depicts a similar transaction but includes updating that content in light of a user's interaction with and modification of the displayed content.

In FIG. 6A, mobile device 600 may include a processor, memory, one or more communication interfaces, a screen capable of displaying a user interface (e.g., a touchscreen), and so on. Mobile device 600 may also contain, among other software modules, native mobile application 602.

Mobile device 600 may be configured to communicate with server device 606, which may be part of computational instance 322, for example. Server device 606 may, in turn, access database 608 to obtain information to transmit to mobile device 600, as well as to store information received from mobile device 600. In alternative embodiments, server device 606 and database 608 may be disposed within managed network 300 or third-party networks 340.

At step 610, native mobile application 602 may transmit a data request to server device 606. The data request may be for data to display on a user interface of native mobile application 602, and may be transmitted in response to user activity and/or based on other criteria.

At steps 612 and 614, server device 606 may query and receive the requested data from database 608. In some embodiments, server device 606 may omit these steps if it contains a copy of the requested data.

At step 616, server device 606 may transmit the requested data to native mobile application 602. This data may include content for display on the user interface, a definition of a particular arrangement of this content, and/or instructions for displaying the content pursuant to the particular, defined arrangement (e.g., a recursively-defined, container-based arrangement of content).

At step 618, in response to receiving the data, native mobile application 602 may display the content on the user interface in accordance with the arrangement. As an example, native mobile application 602 may display the content as a vertical or horizontal lists of elements providing parameters and associated values, all mapped pursuant to a recursively-defined, container-based arrangement of content.

FIG. 6B depicts a transaction similar to that of FIG. 6A, but also shows updating that content in light of a user's interaction with and modification of the content. At step 610, native mobile application 602 may similarly transmit a data request to server device 606. At steps 612 and 614, server device 606 may query and receive the requested data from database 608. At step 616, server device 606 may transmit the requested data to native mobile application 602, and the requested data may include content for display on the user interface as well as a particular, defined arrangement of this content (e.g., a recursively-defined, container-based arrangement of content).

At step 618, in response to receiving the data, native mobile application 602 may similarly display the content on the user interface in accordance with the arrangement. For example, the content may be displayed as a vertical list of rows providing parameters, and associated values, all mapped pursuant to a recursively-defined, container-based arrangement of content (e.g., utilizing the one or more identifiers within one or more of the recursively-defined containers).

At step 620 (which may take place in response to reception of the data of step 618), after the content is displayed, native mobile application 602 may receive a user request to update the data. For instance, the user may change the value of one of the displayed content parameters (e.g., selecting a menu option or a particular value to edit).

Thus, at step 622, native mobile application 602 may transmit, to server device 606, a data update request with the parameter as changed. At steps 624 and 626, server device 606 may transmit the updated data to database 608 and receive an acknowledgement (ACK) that the data has been updated or a copy of the updated data.

At step 628, server device 606 may transmit, to native mobile application 602, a copy of the updated data. This copy may also include any updates made to the overall content and layout of the user interface due to the change in content. For example, if the data as updated takes up more vertical space to display in the user interface, the updated user interface may omit other information that was previously displayed in order to fit the parameter. In another example, the updates might not change anything about the overall layout of the user interface, but may just replace the content that is displayed therein (e.g. text, images, both). Thus, if content is displayed pursuant to a certain set of layout parameters (e.g., a vertical list of rows incorporating a recursively-defined, container-based arrangement of content), as the content is updated, the server device may not have to send updated layout parameters. Instead, the server device may just send content updates containing data that goes in those defined layout parameters. Additionally, at step 630, native mobile application 602 may refresh its user interface to reflect any such updates.

Furthermore, in this fashion, database 608 is updated based on the most recent input from the user of mobile device 600. In this way, the data displayed on the user interface of native mobile application 602 and stored in database 608 may be synchronized and updated instead of requiring duplicative processing and storage C. Example Content Encoding FIGS. 7A-7D provide an illustrative example of how a user interface of a native mobile application could be defined and adapted across different mobile devices. In particular, FIGS. 7A-7D provide an illustrative example of how a native mobile application can cause a GUI to be consistently displayed across different devices, regardless of the features and functionalities of those devices (e.g., orientations, platforms and operating systems, etc.). Nonetheless, the embodiments herein can operate with a wide variety of user interface layouts and designs, and should not be viewed as limited to this example.

Displaying the content of a user interface and its arrangement may be triggered by a variety of events (e.g., launching the application on the mobile device, selection of elements displayed thereon, etc.), all of which can be specified in data transmitted to a native mobile application (e.g., during step 616 of FIGS. 6A and 6B, and/or step 628 of FIG. 6B). While this data can be formatted according to various protocols, one possible formatting is in accordance with JavaScript Object Notation (JSON).

A JSON file that contains all of the information regarding the user interfaces described herein could be quite large (e.g., over 1000 lines of text). For sake of simplicity, a few sections of such a JSON file are discussed below.

FIG. 7A depicts an example JSON specification 700 of a recursive, hierarchical definition of a platform-independent user interface. Notably, this example defines layout, orientation, text and image placement, text and image size, and various other text-related characteristics (e.g., color, font) for various containers displayable in native mobile application user interfaces (e.g., on a mobile device). These attributes define the relative arrangement of a container of a user interface, in which other containers, text, and/or images may be placed, and the arrangement defines a relative placement of this content on the user interface. Section 702 of specification 700, for example, illustrates the highest level in an ordered hierarchy of displayed content and its arrangement. In this example, section 702 defines a first-order ViewGroup as having particular dimensions ("Margin":{"Top":17, "Bottom":7}), as well as a particular orientation ("Vertical"), alignment ("Left"), and distribution ("Auto").

Herein, a "ViewGroup" may represent a container. Each container may encompass one or more other containers, image boxes, text boxes, widget boxes, and so on. Thus, the JSON content of specification 700 defines a hierarchical, tree-like structure of user interface elements.

Turning to section 704 of specification 700, a second-order ViewGroup is illustrated, showing the displayed content and its arrangement within the first-order ViewGroup. In this example, section 704 defines a ViewGroup as having a particular orientation ("Horizontal"), alignment ("Center"), and distribution ("Auto").

Turning to sections 706 and 708 of specification 700, third-order types of data are illustrated showing the displayed content and its arrangement within the second-order ViewGroup. In this example, section 706 defines an image "Type" as having particular dimensions ("Height": 21, "Width": 92, "Margin": {"Right": 8}), as well as string to point to a specific piece of data to be presented in this subpart (an image, shown here as "CellId":"priority image"). Additionally, section 708 defines a text "Type" as having particular dimensions ("Margin": {"Left": 8}), a string to point to a specific piece of data to be presented in this subpart (text, shown here as "CellId":"number"), and formatting for how to present that data, including color ("TextColor": "#92a3b0"), alignment ("TextAlignment": "Left"), how many lines or rows it should take up in the container ("MaxLines": 1) and font ("Font": {"Weight": "regular", "Size": 12}). Other characteristics are possible as well.

The JSON-based GUI definition of FIG. 7A may be arbitrarily large or small, may be displayed in any number of orientations, and may contain any number of containers in any recursive nesting arrangement. In some embodiments, the JSON file may also define the content that is to be displayed in these containers (e.g., text, URLs referring to images, etc.) or refer to content to be obtained from specific fields of a database table. Alternatively, this content can be defined in a separate file. Regardless of where it is located, the content may be linked to the user interface definition by the "CellId" attributes. For example, user interface definition of FIG. 7A may define a number of containers, each with a unique CellId, and the content may refer to these CellIds in order to map content values (e.g., text, URLs referring to images, etc.) to containers.

FIG. 7B depicts a tree-like hierarchical view of the sections of specification 700 as described in connection with FIG. 7A. As shown, FIG. 7B illustrates first-order ViewGroup 710 (pertaining to a high-level layout and orientation of content to be displayed on a mobile device and corresponding to section 702), second-order ViewGroup 712 (pertaining to the displayed content and its arrangement within the first-order ViewGroup 710 and corresponding to section 704), and two third-order types of data (pertaining to image-based content and text-based content to be displayed in a row of second-order ViewGroup 712). Particularly, type 714 is an image box (I) and corresponds to section 706, while type 716 is a text box (T) and corresponds to section 708. As noted by the " . . . " in FIG. 7B, other content, ViewGroup(s), types, and associated characteristics are possible in connection with FIGS. 7A and 7B.

FIG. 7B demonstrates that the recursive, hierarchical GUI definition of FIG. 7A can be represented as a tree in which ViewGroup containers are root or intermediate nodes and Type containers (e.g., images boxes and text boxes) are leaf nodes. As with the JSON definition of FIG. 7A, the tree of FIG. 7B can be arbitrarily complex and arbitrarily deep.

As seen in FIG. 7C, the JSON file excerpt in FIG. 7A can be used on various platforms to create a user interface layout in accordance with the definition therein. For example, when processed, section 702 of specification 700 might cause a container 718 to be defined as having a particular orientation (here, vertical), alignment (here, left), and distribution of some content therein (here, e.g., auto), and to be displayed on a user interface of a native mobile application executing on a mobile device. As illustrated in FIGS. 7A and 7B, container 718 corresponds to section 702 and ViewGroup 710.

Container 718 may include containers 719, 724, and 726 (e.g., sub-containers of container 718), each of which may also contain further nested containers. Container 719 is defined by section 704 and ViewGroup 712. Here, the definitions of containers 724 and 726 are omitted from the JSON file of FIG. 7A. The vertical orientation of container 718 causes containers 719, 724, and 726 to be arranged, overall, vertically; but, the definitions of containers 719, 724, and 726 cause them, individually, to be arranged horizontally (corresponding to section 704, e.g., for container 719).

Specifically, container 719 contains user interface elements 720 and 722. User interface element 720 is defined by section 706 and type 714, and user interface element 722 is defined by section 708 and type 716. The horizontal orientation of container 719 causes containers 720 and 722 to be arranged horizontally. Note that container 724 is depicted as not containing any sub-containers or boxes, while container 726 is depicted as containing two sub-containers or boxes, similar to those of container 719.

There is a direct and unambiguously-defined relationship between the user interface definition of FIG. 7A, the tree-based view thereof in FIG. 7B, and the arrangement of containers in the user interface actually being displayed in FIG. 7C. This allows a user interface to be defined programmatically, and this definition can be dynamically generated and delivered upon request to a native mobile application.

Figure 7D:
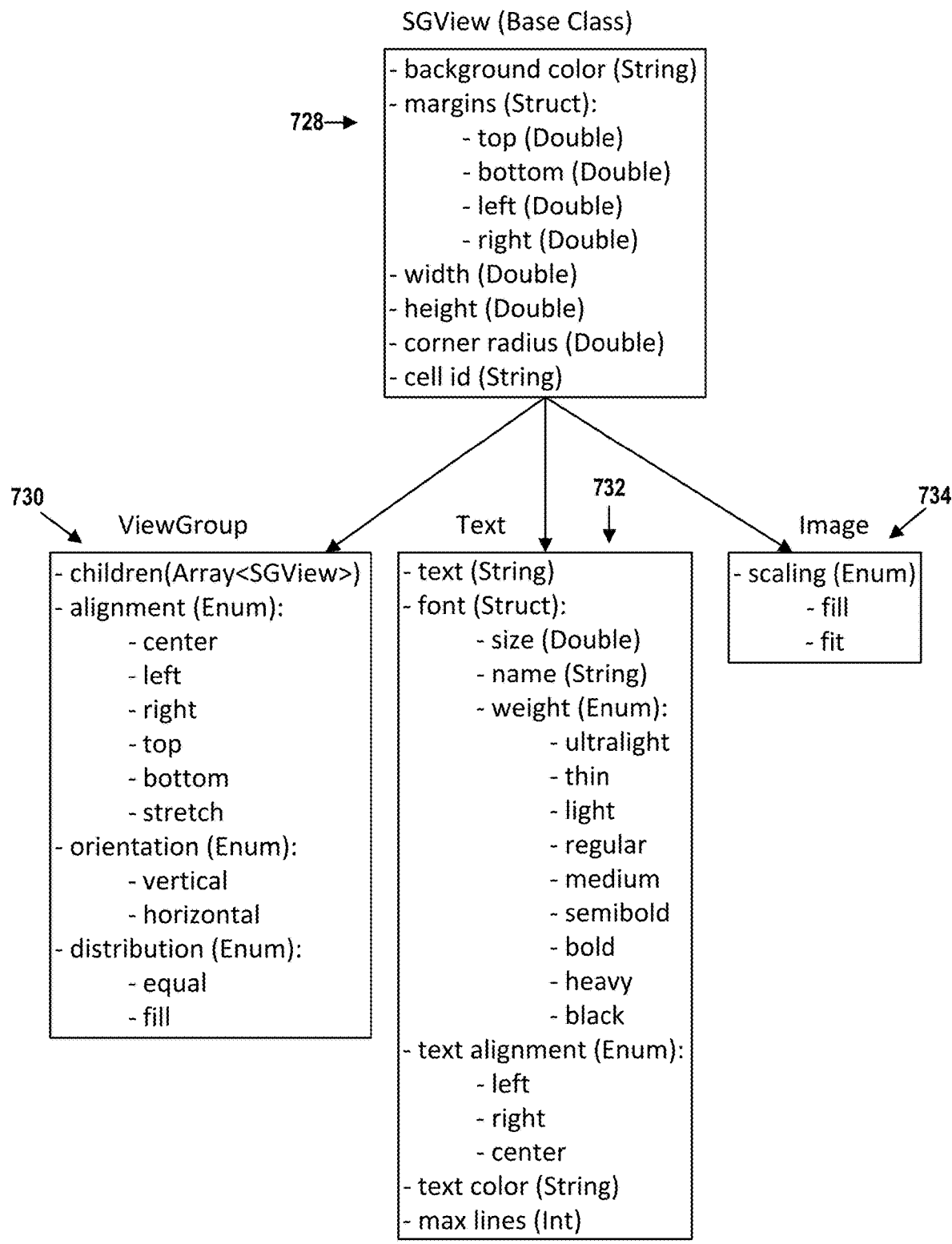
FIG. 7D depicts a class hierarchy for implementing GUI elements, in accordance with example embodiments.

FIG. 7D defines a class hierarchy for elements of the user interface definition described in the context of FIGS. 7A, 7B, and 7C. This hierarchy defines a recursive data structure for representing such a user interface definition.

In FIG. 7D, for example, a base class 728 can be defined (e.g., "SGView (Base Class)"). Within this base class, one or more characteristics might also be defined, including: color (e.g., "background color (String)"), margins (e.g., "margins (Struct):", "top (Double)", "bottom (Double)", "left (Double)", "right (Double)"), dimensions ("width (Double)", "height (Double)") and presentation ("corner radius (Double)"), and code to point to a specific piece of data to be presented in this subpart ("cell id (String)", discussed above in terms of "CellId").

Base class 728 supports subclasses 730, 732, and 734. The native mobile application may use one or more of these subclasses to map content, both in terms of what is presented (e.g., text and images) and how it is presented (e.g., layout) via the GUI. Subclass 730 defines a ViewGroup as described above. Particularly, Subclass 730 specifies one or more characteristics including children to be nested within a container defined by a ViewGroup (e.g., "children (Array<SGView>)"), alignment (e.g., "alignment (Enum)", "center", "left", "right", "top", "bottom", and "stretch"), orientation (e.g., "orientation (Enum)", "vertical", and "horizontal"), and distribution ("distribution (Enum)", "equal", and "fill").

Subclass 732 defines the data type Text, data including text to be presented within a ViewGroup (e.g., "text (String)"), font (e.g., "font (String)", "size (Double)", "name (String)", and "weight (Enum)", which may be further defined as "ultralight", "thin", "light", "regular", "medium", "semibold", "bold", "heavy", and "black"), and text alignment (e.g., "text alignment (Enum)", "left", "right", and "center"), as well as color ("text color (String)"), and how many lines/rows the text should take up in the container ("max lines (Int)"). Subclass 734 defines the data type Image, including how an image box should be scaled within a container may also be defined (e.g., "scaling (Enum)", "fill" and "fit").

In accordance with object-oriented design, base class 728 may represent the base view with all the base properties of a particular user interface layout appearing on the native mobile application, while (1) subclass 730 may inherit from base class 728, allowing the native mobile application to arrange subparts in a vertical or horizontal layout, (2) subclass 732 may inherit from base class 728, allowing the native mobile application to display text; and (3) subclass 734 may inherit from base class 728, allowing the native mobile application to display one or more images.

All of these definitions are in accordance with a recursively-defined, container-based, spatially-organized arrangement of the content. Other characteristics, layouts, and hierarchies are possible, including subclasses for the buttons and other widgets.

In some embodiments, the representation of the tree (e.g., a JSON string or file) is stored in-memory as a tree (using JavaScript classes). Each therein node stores a respective user interface element and its properties. As noted previously, such a user interface element can be either a container, text box, image box, widget box, etc. with the only restrictions being that the root node and intermediate nodes are containers, and the leaf nodes are not containers. When displayed on a web-based user interface, the in-memory tree can be traversed and rendered using React components, for example. When saved, the tree is traversed and compiled into the aforementioned JSON string or file.

VI. Example Empty States and Replacement Content

Figure 8A:
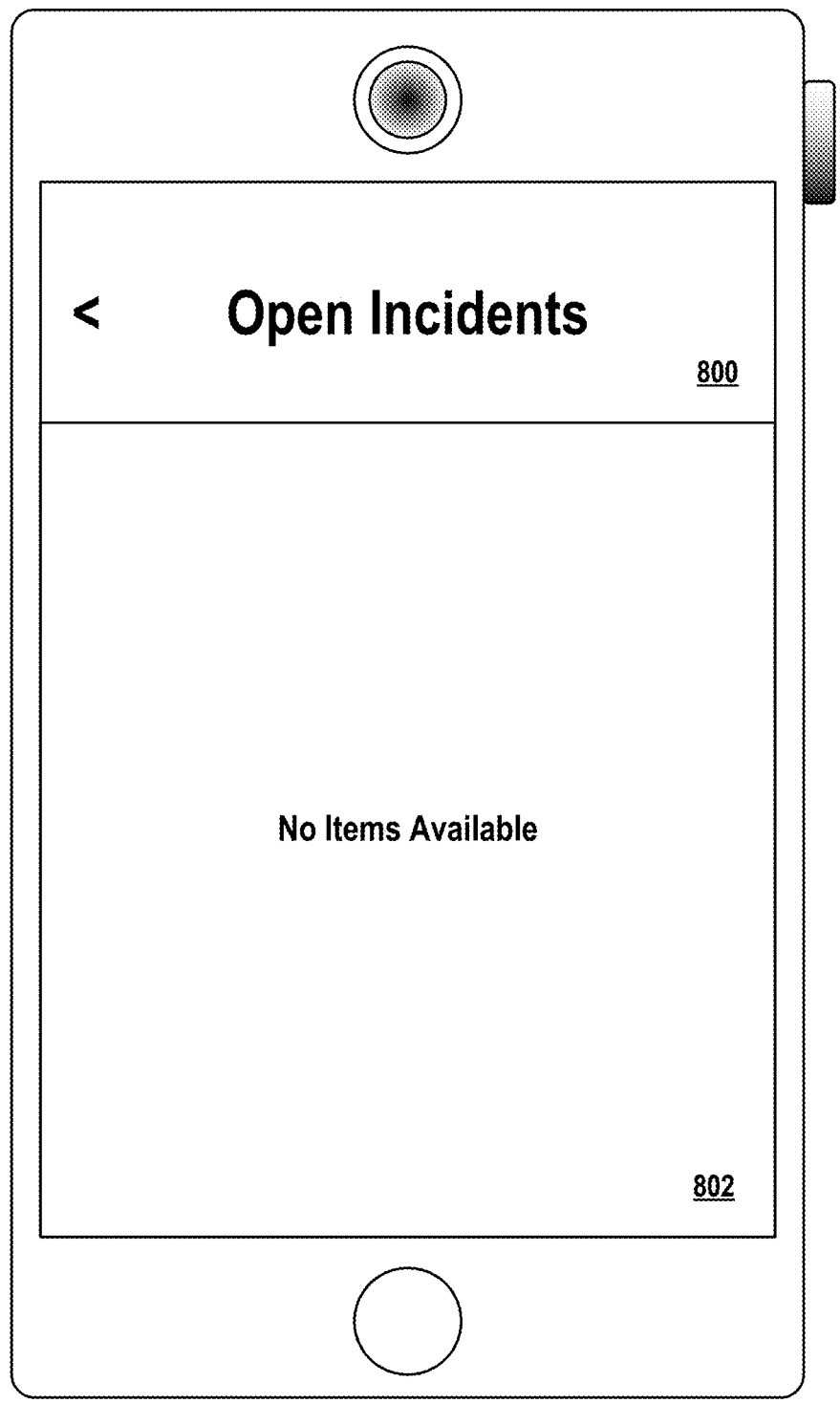
FIGS. 8A and 8B depict renderings of empty states, in accordance with example embodiments.
Figure 8B:
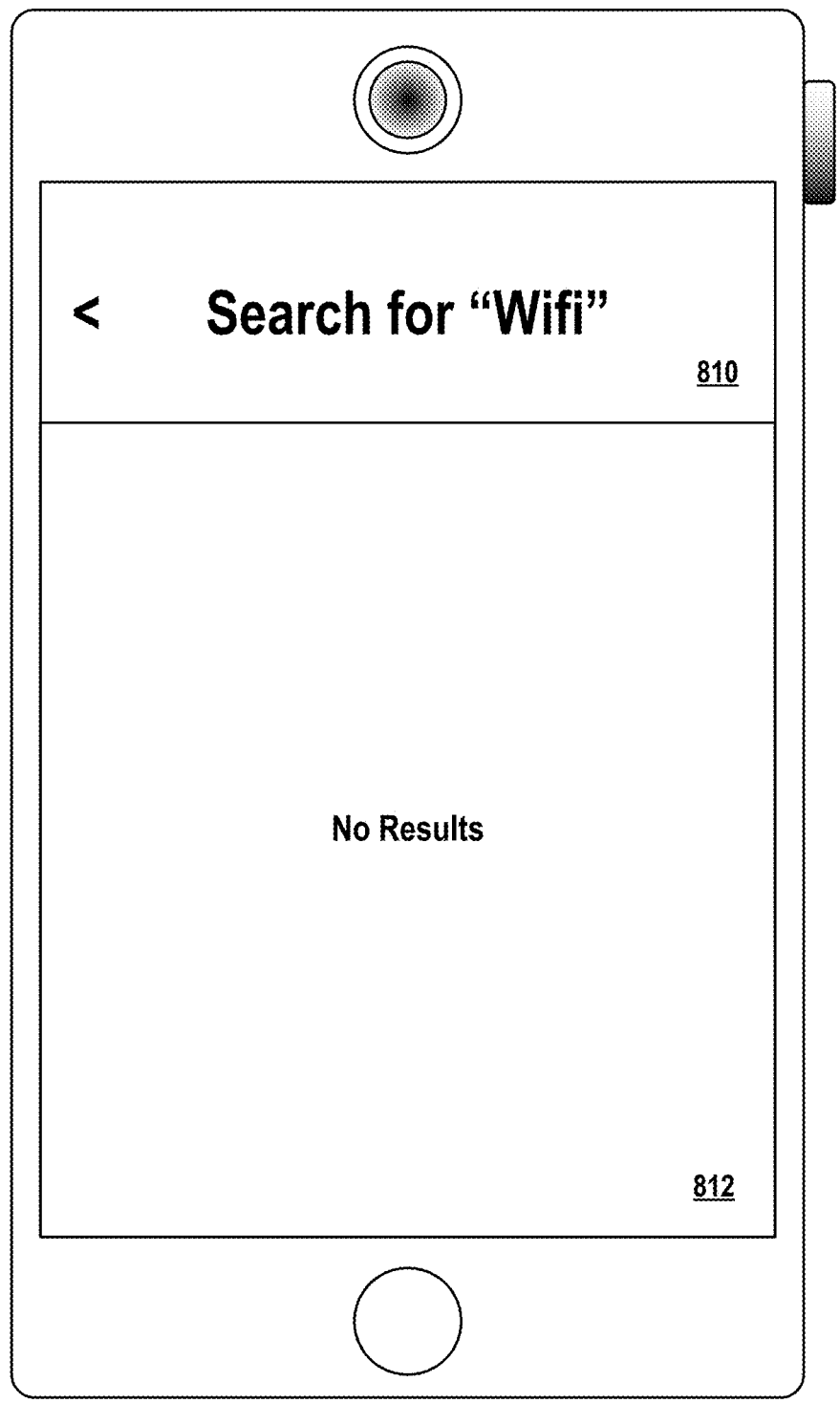

To assist with visualization of empty states, FIGS. 8A and 8B depict two examples thereof. In FIG. 8A, a GUI on a mobile device includes segment 800 and segment 802. Segment 800 provides a title for the content that would normally be shown within segment 802. In this case, the user has requested a list of open incidents (e.g., IT trouble tickets) which is entitled by the text in segment 800. No open incidents exist, so an empty state is shown in segment 802 with the text "No Items Available".

Similarly, in FIG. 8B, a GUI on a mobile device includes segment 810 and segment 812. Segment 810 provides a title for the content that would normally be shown within segment 812. In this case, the user has searched for the term "Wifi" which is entitled by the text in segment 810. No results with this term were found, so an empty state is shown in segment 812 with the text "No Results".

Figure 9A:
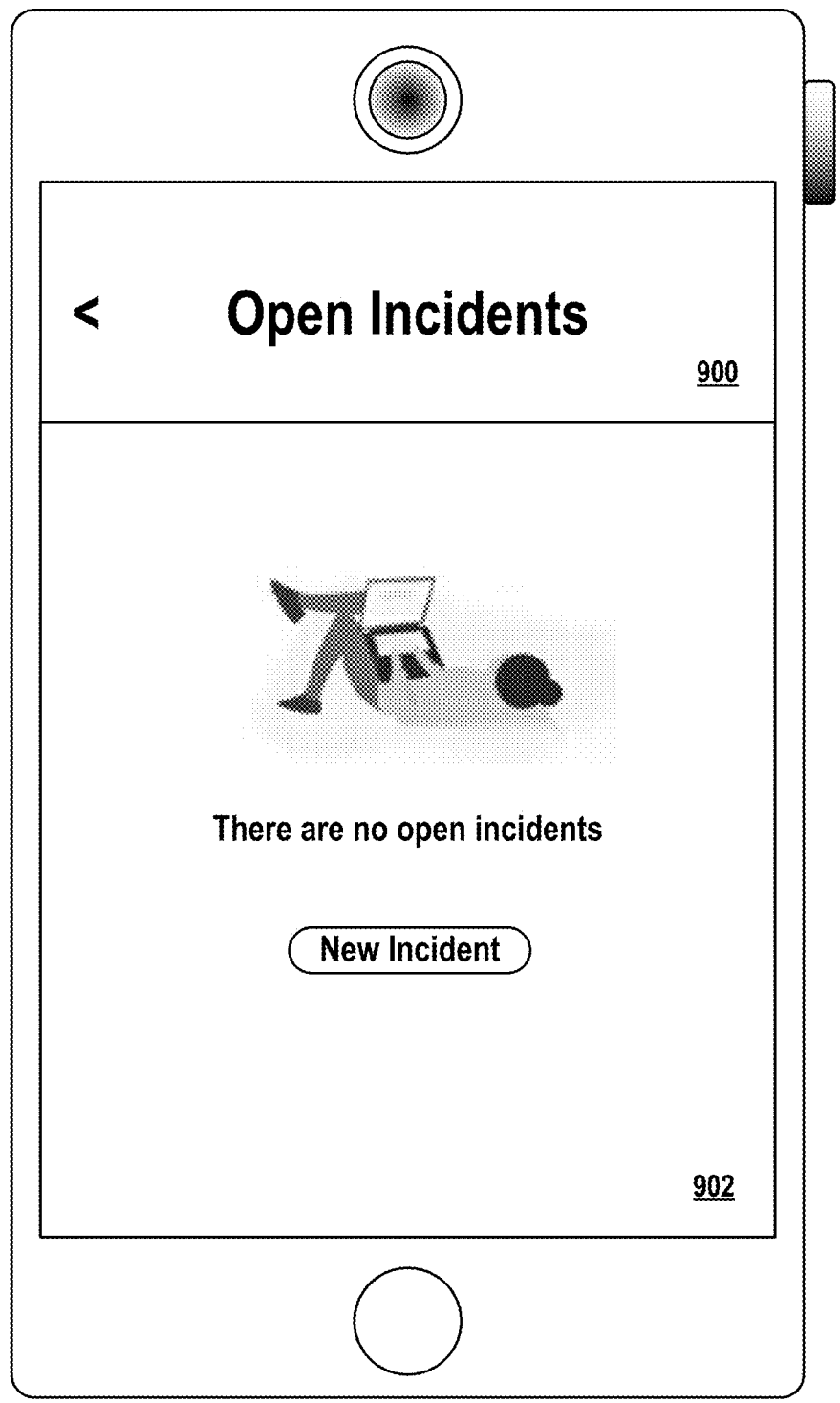
FIGS. 9A and 9B depict renderings of replacements for empty states, in accordance with example embodiments.
Figure 9B:

FIGS. 9A and 9B depict GUIs with respective replacements for these empty states. In FIG. 9A, a GUI on a mobile device includes segment 900 and segment 902. Segment 900 corresponds to segment 800 and provides a title for the content that would normally be shown within segment 902. But unlike segment 802, segment 902 includes an image, text, and a button.

Likewise, in FIG. 9B, a GUI on a mobile device includes segment 910 and segment 912. Segment 910 corresponds to segment 810 and provides a title for the content that would normally be shown within segment 912. But unlike segment 812, segment 912 includes an image, text, and three buttons.

Advantageously, the replacements for the empty states provide a richer user experience (images, text, and buttons as opposed to only text), and allows this content to be configured to be relevant to the context of the application. For example, in segment 902 there are no incidents to be shown, and the image depicts a relaxed user while the button allows a new incident to be created.

Replacements for empty states are not limited to the embodiments of FIGS. 9A and 9B. In general, such replacements can be configured with any number of images, units of text, and buttons, and these GUI components may be arranged in various ways. For instance, an alternative arrangement could include text above two side-by-side images that are in turn above two side-by-side buttons. Other possibilities exist.

Further, although the embodiments herein describe GUI widgets in terms of buttons, other GUI widgets may be used. Thus, references to buttons herein should be interpretation to include any form of widget, such as menus, sliders, toggles, tabs, selectors, and so on.

VII. Example Software Architecture

Figure 10:
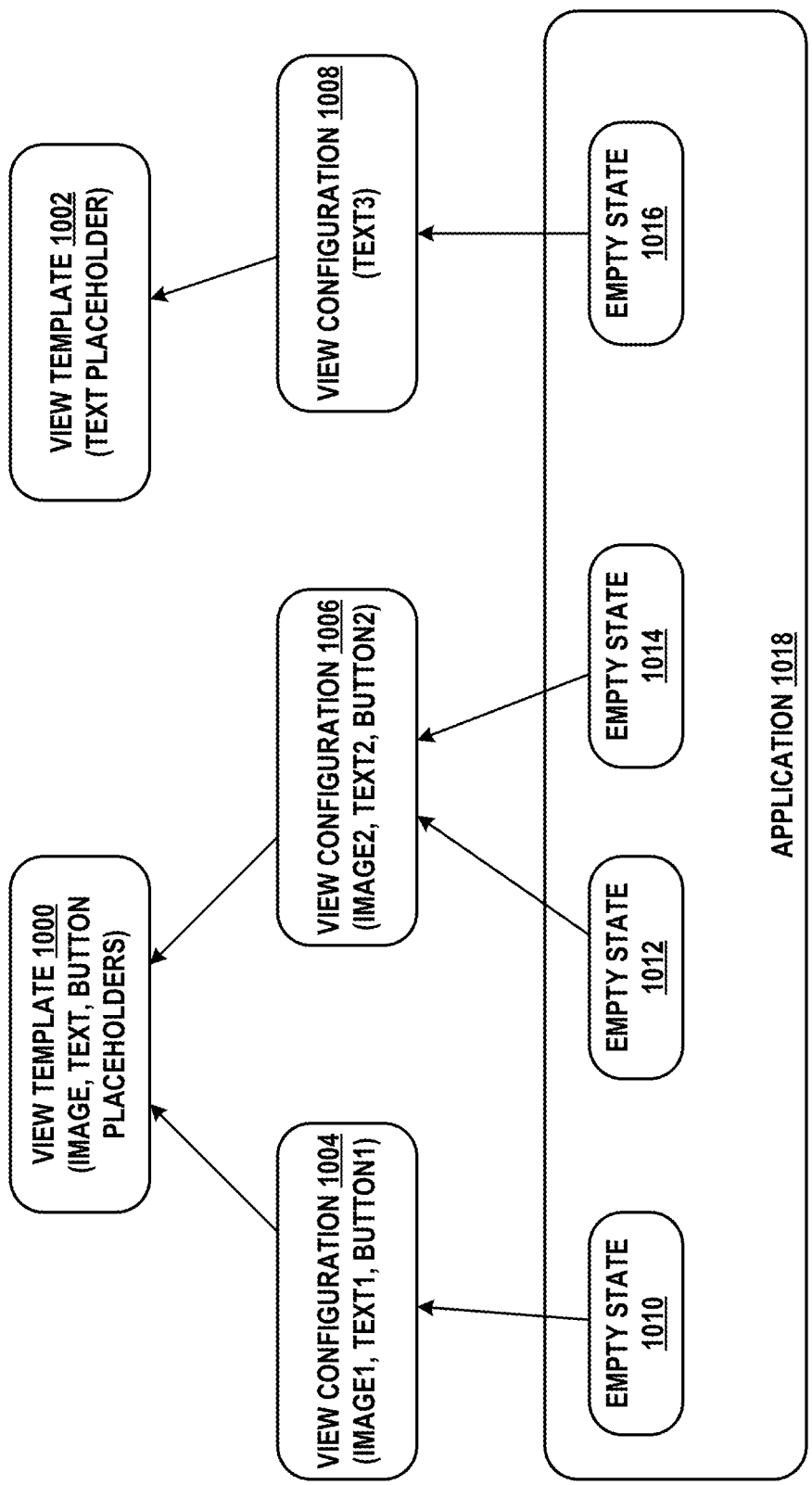
FIG. 10 depicts a software architecture for specifying replacements for empty states, in accordance with example embodiments.

FIG. 10 depicts an example software architecture for specifying replacements for empty states. This architecture consists of a configurable, template-based definition of empty states and their associated replacement content.

This software architecture can be based on one or more view templates, exemplified by view templates 1000 and 1002. Each view template may define an arrangement of one or more placeholders for images, units of text, and buttons. For instance, view template 1000 may define a vertical arrangement of one image, one unit of text, and one button (e.g., corresponding to what is shown in segment 902), while view template 1002 may define a simple arrangement of just one unit of text. These templates may be defined using the recursive, hierarchical JSON definition of a platform-independent user interface described above.

Turning temporarily to FIGS. 11A and 11B, JSON 1100 partially encodes view template 1000 while JSON 1102 fully encodes view template 1002. Notably, JSON 1100 defines view template 1000 as a horizontal arrangement that, in turn, contains a vertical arrangement of an image above a unit of text. The image is defined by an image block ("type": "Image") and specifies the image's corner radius, height, width, and margin. The image is also tagged with the placeholder IMAGESLOT1. The text is defined by a text block ("type": "Text") and specifies the text's margin, color, alignment, maximum number of lines, font, and width. The image is also tagged with the placeholder TEXTSLOT1. More or fewer configuration parameters may be defined for each of these blocks.

As noted, the image and text blocks of JSON 1100 define a placeholder for the image and unit of text shown in segment 902. For sake of simplicity, JSON 1100 does not include a definition of the button. Nonetheless, such a button could be defined as an embedded arrangement of one or more ViewGroups that specify the button's height, width, corner radius, margins, text, text color, text alignment, text font, and so on.

JSON 1102 defines view template 1002 as a horizontal arrangement that, in turn, contains a vertical arrangement of a unit of text. The text is defined by a text block ("type": "Text") and specifies the text's margin, color, alignment, maximum number of lines, font, and width. The image is also tagged with the placeholder TEXTSLOT2. More or fewer configuration parameters may be defined for each of these blocks.

The tags (IMAGESLOT1, TEXTSLOT1, and TEXT-SLOT2) represent placeholders in their respective units of JSON that are to be filled in by a view configuration. Turning back to FIG. 10, there can be a many-to-one relationship between view configurations and view templates. As shown, view configurations 1004 and 1006 make use of view template 1000, while view configuration 1008 makes use of 1002.

More specifically, view configurations 1004 and 1006 each refer to specific images, units of texts, and buttons that can be used with view template 1000. Thus, view configuration 1004 refers to image1, text1, and button1, that will be used as replacements for the image, text, and button placeholders in view template 1000. Likewise, view configuration 1006 refers to image2, text2, and button2, that will be used as replacements for the image, text, and button placeholders in view template 1000. View configuration 1008 refers to text3 that will be used as a replacement for the text placeholders in view template 1002.

This replacement content may be stored in various ways. For example, images may be stored in a filesystem, and references to image content may specify each image's file name and/or directory path. Text and button definitions may be stored such a filesystem and referenced in a similar way, or stored in a database table (e.g., within CMDB 500). In various embodiments, references to image, text, and/or button content may be obtained directly or indirectly by way of entries in one or more tables of a database.

View templates and view configurations may be specified in a number of ways. They could be designed by way of a GUI presented by a computational instance, and then stored in a database. Alternatively, they could be designed by way of configuration files that are stored in a filesystem. Other possibilities exist.

FIG. 10 also shows application 1018 which includes empty states 1010, 1012, 1014, and 1016. Each of these empty states may represent a point in the workflow of application 1018 where its GUI has no specific data or results to display. There may be a many-to-one relationship between empty states and view configurations. As shown, empty state 1010 uses view configuration 1004, empty states 1012 and 1014 use view configuration 1006, and empty state 1016 uses view configuration 1008.

Architecturally, application 1018 may include empty states 1010, 1012, 1014, and 1016 and refer to view configurations 1004, 1006, and 1008. For example, the empty state of segment 902 may be empty state 1010 and may refer to view configuration 1004 for its image, text, and button definitions, which will be arranged in accordance with view template 1000.

Thus, in this model, view configurations 1004, 1006, and 1008 and view templates 1000 and 1002 may be logically distinct from application 1018 and therefore usable by other applications as well. Alternatively, application 1018 may include empty states 1010, 1012, 1014, and 1016 and view configurations 1004, 1006, and 1008 as well. In this alternative model, only view templates 1000 and 1002 may be logically distinct from application 1018 and therefore usable by other applications as well. In another alternative, application 1018 may include empty states 1010, 1012, 1014, and 1016, view configurations 1004, 1006, and 1008, and view templates 1000 and 1002. Put another way, embodiments exist in which view templates and/or view configurations can be reused between different applications or are dedicated to particular applications.

Some embodiments may allow definition of a default view template for replacement of empty states. Such a default view template could contain any arrangement of images, text, and/or buttons, as discussed above. Application 1018 may be configured to use the default view template (by way of one or more view configurations) when no other view template/view configuration is associated with an empty state. When a specific non-default view template/view configuration is associated with an empty state, that non-default view template/view configuration will be used to generate the replacement content. Default and non-default views may be defined at an application level (applying to all GUIs and segments thereof in an application), at a GUI screen level (applying to a particular GUI screen and segments thereof), and/or at a segment level.

Advantageously, this allows the content of the empty state to be related to the context of the application rather than just be a generic indication that there is nothing to be displayed. Specific view configurations can be defined for specific empty states in order to facilitate this functionality.

VIII. Example Transactions and Encoding

Processing in accordance with the embodiments of FIGS. 10, 11A, and 11B may take place as follows. A server device (e.g., from computational instance 322) may receive a request from a mobile application executing on a client device. The server device may determine that it has no results to provide in response to this request and thus it would indicate an empty state (e.g., empty state 1010) to the mobile application. The server device may further determine that this empty state is associated with a view configuration (e.g., view configuration 1004) which uses a view template (e.g., view template 1000). The server device then obtains this view template and writes the replacement content of the view configuration into the placeholders of the view template. For example, this might involve overwriting the CellId and/or Id of an image, text, and/or button block. The resulting modified template represents the empty state and can be provided, perhaps with additional content, to the client device. In some cases, the server device may temporarily store the modified template and/or additional content in a cache so that steps of this process can be skipped in the future.

This additional content may represent a screen for a GUI of which the empty state appears in a segment (where a screen is defined to be the GUI content that is viewable on a client device at a given point in time). When there are multiple segments in a screen, there may be replacements for multiple empty states contained within the representation of the screen.

The client device then displays this information as a replacement for one or more empty states (e.g., as shown in FIGS. 9A and 9B). Particularly, the client device parses the representation (e.g., the JSON specification of the GUI), and arranges the content of the GUI in accordance with this representation.

Figure 12:
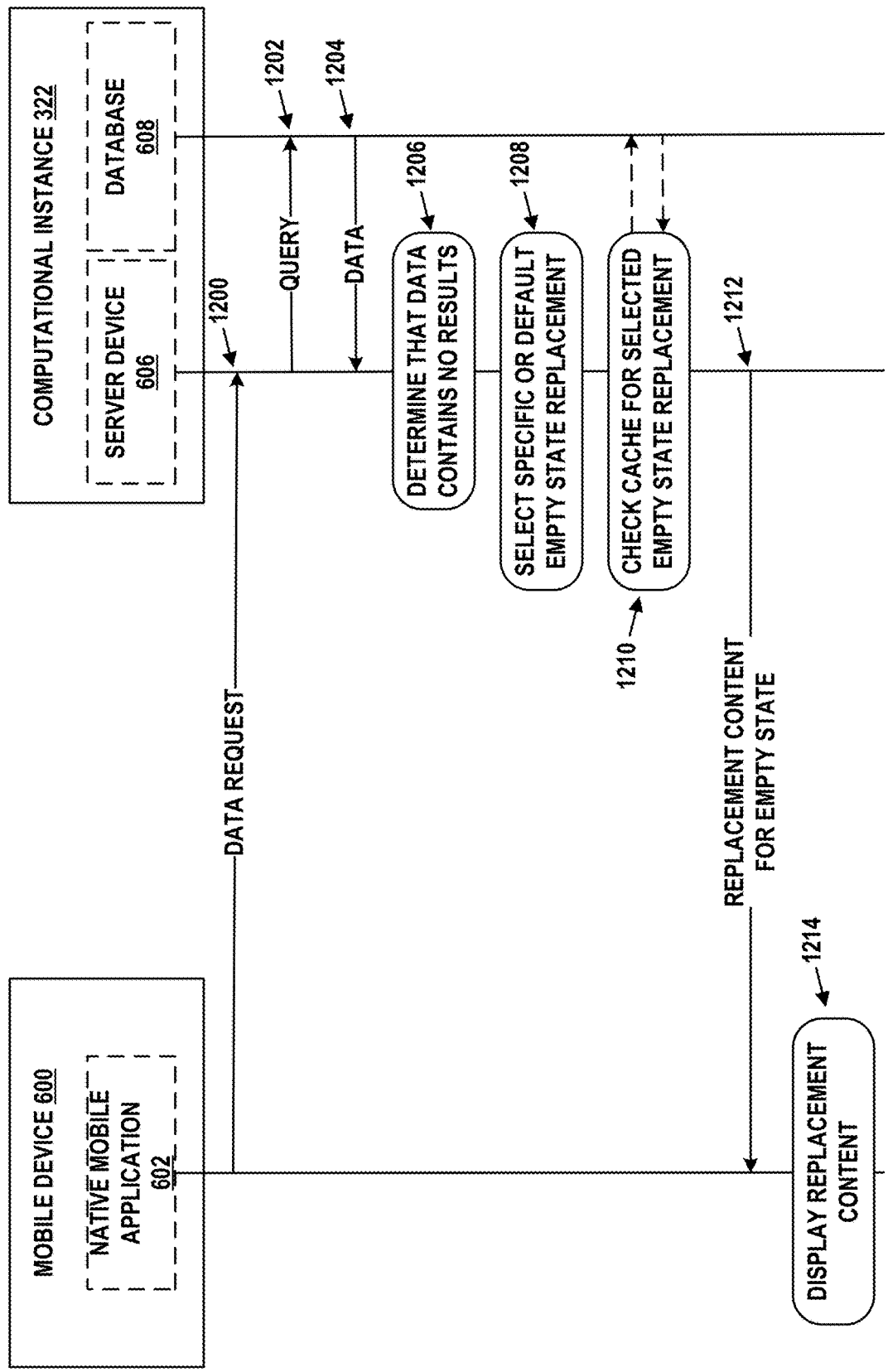
FIG. 12 is a message flow diagram, in accordance with example embodiments.

FIG. 12 depicts such transactions in more detail. In this depiction, mobile device 600 is executing native mobile application 602, while computational instance 322 includes server device 606 and database 608.

At step 1200, native mobile application 600 transmits a data request to server device 606. This data request may be for a GUI screen or a segment of a GUI screen.

At step 1202, server device 606 transmits a query to database 608. The query may be based on the data request with the goal of obtaining at least some of the requested data from database 608.

At step 1204, database 608 provides data to server device 606. In this scenario, it is assumed that there were no results and that the data indicates as such. For example, the data may contain a null value, and empty list, or the like.

At step 1206, server device 606 determines that the data contains no results. This means that the response to the data request should indicate some form of empty state. Server device 606 is configured to provide replacement content for the empty state.

Therefore, at step 1208, server device 606 selects either a specific or default empty state replacement. As noted above, a default empty state replacement may be configured for use on multiple GUI screens of an application or multiple segments of one or more GUI screens when no specific empty state replacement exists for these GUI screens or segments. On the other hand, if a specific empty state replacement exists for a GUI screen or segment to be displayed in response to the data request, it will be selected.

At step 1210, server device 606 checks a cache for the selected empty state replacement. If the cache contains the selected empty state replacement, it may be obtained from the cache without accessing database 608. Otherwise, the selected empty state replacement is generated from information in database 608 and then stored in the cache (this is depicted in FIG. 12 as the dotted lines between step 1210 and database 608). The selected empty state replacement may be populated based on the view configuration to which it refers, as well as the view template referenced by this view configuration. Advantageously, use of the cache reduces load on database 608.

At step 1212, server device 606 transmits this replacement content for the empty state (e.g., a JSON file or unit of JSON specifying the replacement content) to native mobile application 602. At step 1214, native mobile application 602 parses, renders, and displays the appropriate GUI screen or segment with the specified replacement content.

In some cases, step 1212 involves server device 606 transmitting a representation of an entire GUI screen (e.g., specified with JSON) that contains multiple segments with empty state replacement content. Some of these segments may make use of the same empty state configuration (e.g., the same view configuration and view template or at least the same view template). In order to avoid repeating the empty state configuration in multiple places throughout the representation (and thus using more memory on server device 606 and native mobile application 602 as well as more network capacity for transmission), the representation may be organized as shown in FIG. 13.

Figure 13:
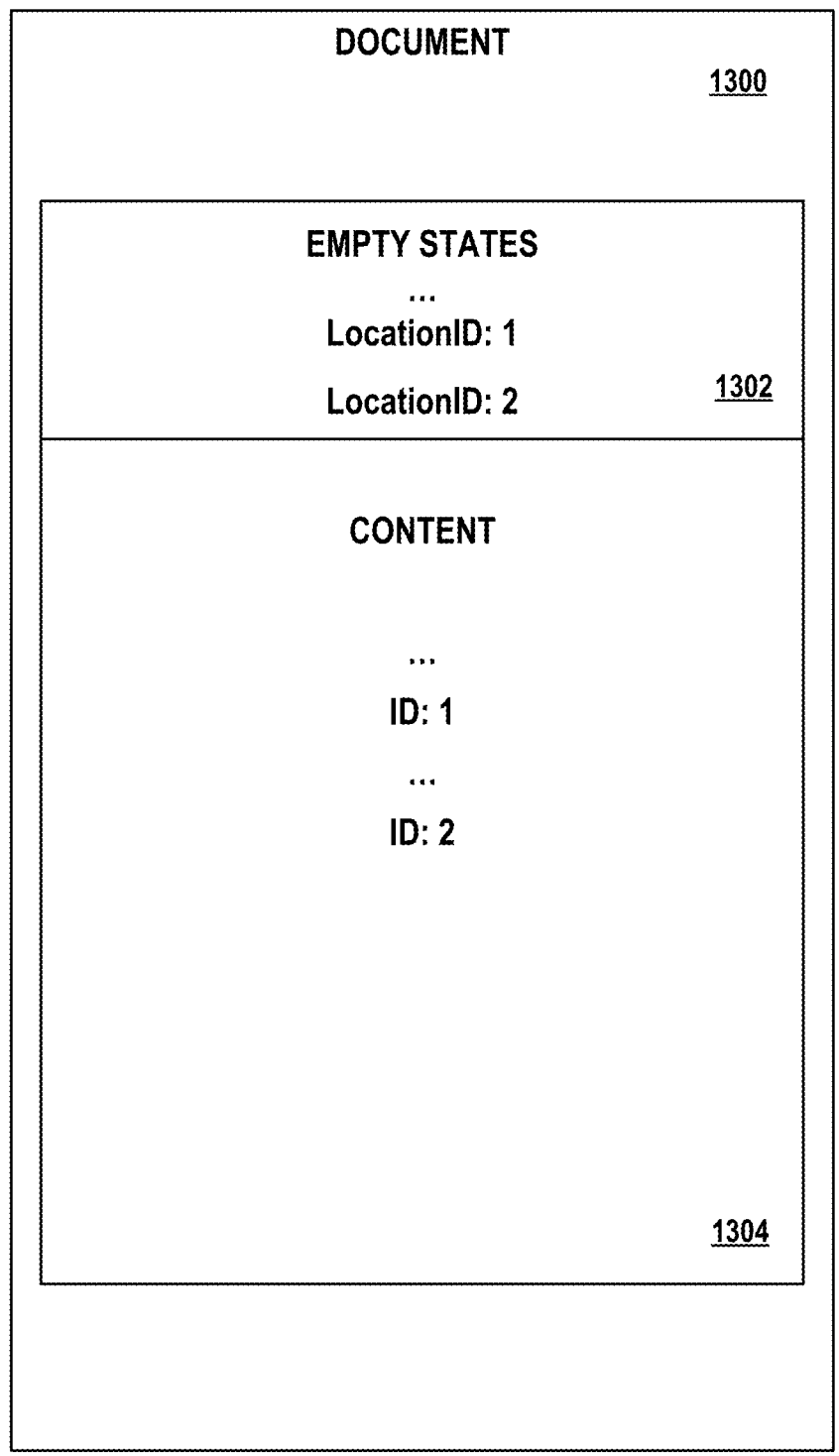
FIG. 13 is an information format for defining a GUI, in accordance with example embodiments.

Particularly, FIG. 13 depicts the representation as document 1300. This document contains two sections of relevance to this discussion, empty states 1302, and content 1304. In empty states 1302, replacement content for one or more empty states is defined. Also, one or more LocationID parameters are defined for each. The LocationID parameters are unique references to identifiers in content 1304. Thus, for example, a particular empty state may have LocationID 1 and LocationID 2 defined, as shown in empty states 1302. These LocationIDs refer to ID 1 and ID 2 defined in content 1304. When rendering the GUI screen, native mobile application 602 reads document 1300 and replaces ID 1 and ID 2 with their associated empty state replacement content.

Nonetheless, FIG. 13 depicts just one possible way of avoiding the repetition of empty state definitions in a document. Other possibilities exist.

IX. Example Operations

Figure 14:
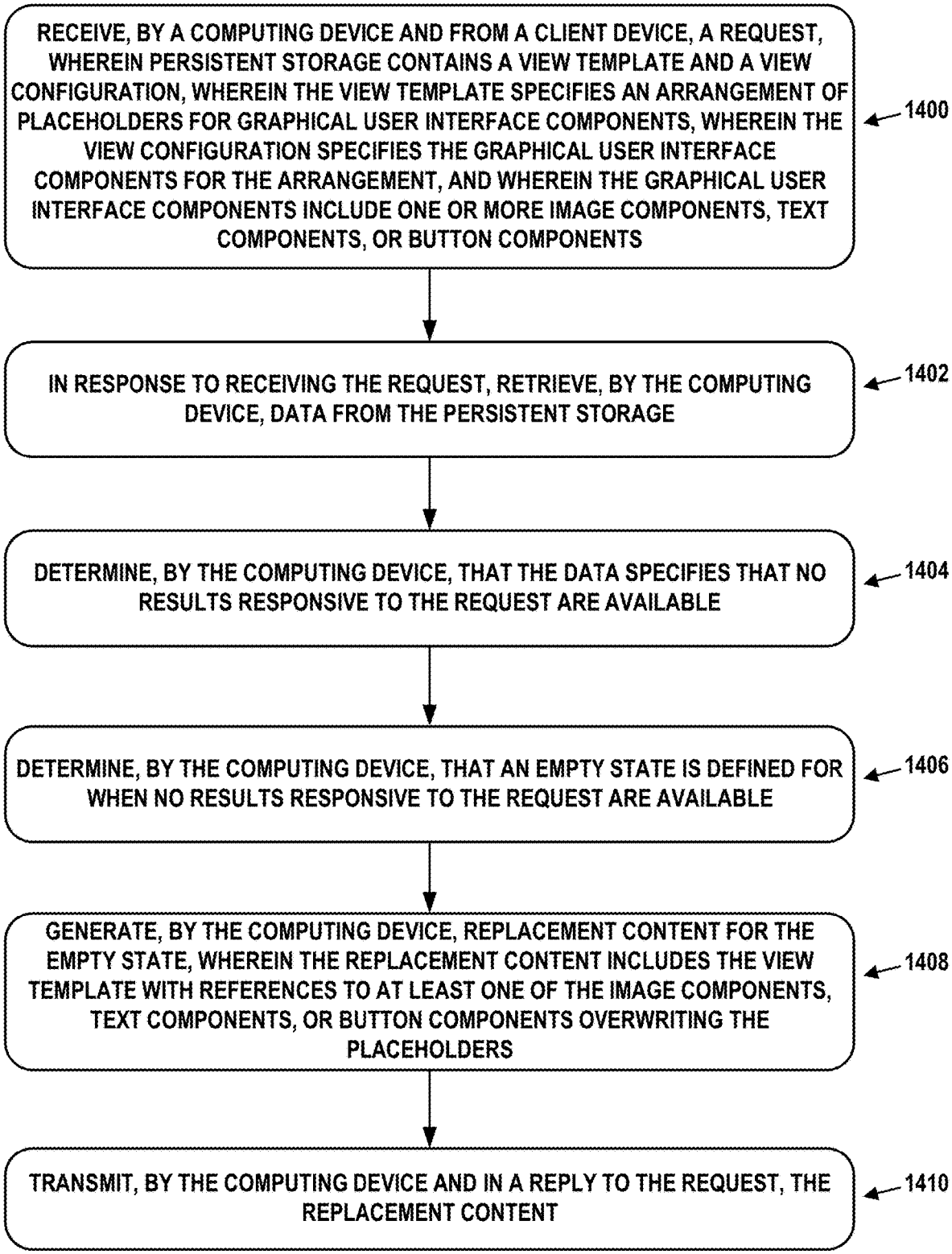
FIG. 14 is a flow chart, in accordance with example embodiments.

FIG. 14 is a flow chart illustrating an example embodiment. The process illustrated by FIG. 14 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 14 may be simplified by the removal of any one or more of the features shown therein. Further, these embodiments may be combined with features, aspects, and/or implementations of any of the previous figures or otherwise described herein.

Block 1400 may involve receiving, by a computing device and from a client device, a request, wherein persistent storage contains a view template and a view configuration, wherein the view template specifies an arrangement of placeholders for graphical user interface components, wherein the view configuration specifies the graphical user interface components for the arrangement, and wherein the graphical user interface components include one or more image components, text components, or button components.

Block 1402 may involve, possibly in response to receiving the request, retrieving, by the computing device, data from the persistent storage.

Block 1404 may involve determining, by the computing device, that the data specifies that no results responsive to the request are available.

Block 1406 may involve determining, by the computing device, that an empty state is defined for when no results responsive to the request are available.

Block 1408 may involve generating, by the computing device, replacement content for the empty state, wherein the replacement content includes the view template with references to at least one of the image components, text components, or button components overwriting the placeholders.

Block 1410 may involve transmitting, by the computing device and in a reply to the request, the replacement content.

In some embodiments, the persistent storage also contains a second view template and a second view configuration, wherein the second view template specifies a second arrangement of second placeholders for second graphical user interface components, wherein the second view configuration specifies the second graphical user interface components for the second arrangement, and wherein the second graphical user interface components include one or more further image components, text components, or button components. These embodiments may further involve the computing device being configured to: receive, from the client device, a second request; possibly in response to receiving the second request, retrieve second data from the persistent storage; determine that the second data specifies that no results responsive to the second request are available; determine that a second empty state is defined for when no results responsive to the second request are available; generate second replacement content for the second empty state, wherein the second replacement content includes the second view template with references to at least one of the further image components, text components, or button components overwriting the second placeholders; and transmit, in a second reply to the second request, the second replacement content.

In some embodiments, the persistent storage also contains a second view configuration, wherein the second view configuration specifies second graphical user interface components for the arrangement, wherein the second graphical user interface components include one or more further image components, text components, or button components. These embodiments may further involve the computing device being configured to: receive, from the client device, a second request; possibly in response to receiving the second request, retrieve second data from the persistent storage; determine that the second data specifies that no results responsive to the second request are available; determine that a second empty state is defined for when no results responsive to the second request are available; generate second replacement content for the second empty state, wherein the second replacement content includes the view template with references to at least one of the further image components, text components, or button components overwriting the placeholders; and transmit, in a second reply to the second request, the second replacement content.

Some embodiments may further involve the computing device being configured to: receive, from the client device, a second request; in response to receiving the second request, retrieve second data from the persistent storage;

determine that the second data specifies that no results responsive to the second request are available; determine that a second empty state is defined for when no results responsive to the second request are available; generate second replacement content for the second empty state, wherein the second replacement content includes the view template with references to at least one of the image components, text components, or button components overwriting the placeholders; and transmit, in a second reply to the second request, the second replacement content.

In some embodiments, the arrangement of placeholders recursively defines a hierarchy of the graphical user interface components.

In some embodiments, the arrangement of placeholders defines relative horizontal and vertical positioning of the graphical user interface components.

In some embodiments, a first number of image components matches a first amount of image placeholders, a second number of text components matches a second amount of text placeholders, and a third number of button components matches a third amount of button placeholders.

In some embodiments, the request relates to content for an application containing one or more graphical user interface screens, a graphical user interface screen containing one or more segments, or a segment of a particular graphical user interface screen.

In some embodiments, the empty state is a default empty state that applies when no results responsive to the request are available and also applies when no results responsive to one or more other requests are available.

In some embodiments, the empty state is a specific empty state associated with the request that overrides any default empty state that is defined in relation to the client device.

Some embodiments may involve a cache of recently-accessed content, wherein the persistent storage includes a database containing the view template and the view configuration, and wherein generating the replacement content comprises: (i) determining that the replacement content is not in the cache, (ii) obtaining the replacement content from the database, and (iii) writing the replacement content to the cache.

Some embodiments may involve a cache of recently-accessed content, wherein the persistent storage includes a database containing the view template and the view configuration, and wherein generating the replacement content comprises: (i) determining that the replacement content is in the cache, and (ii) obtaining the replacement content from the cache without accessing the database.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
persistent storage containing a view template and a view configuration, wherein the view template specifies an arrangement of placeholders for graphical user interface components, wherein the view configuration specifies the graphical user interface components to be used as replacements for the placeholders, and wherein the graphical user interface components include one or more image components, text components, or button components; and
one or more processors configured to:
receive, from a client device, a request;
in response to receiving the request, retrieve data from the persistent storage;
determine that the data specifies that no results responsive to the request are available;
determine that an empty state is defined to use the view configuration when no results responsive to the request are available;
generate replacement content for the empty state, wherein the replacement content includes the view template with references to at least one of the graphical user interface components of the view configuration overwriting the placeholders; and
transmit, in a reply to the request, the replacement content.

2. The system of claim 1, wherein the persistent storage also contains a second view template and a second view configuration, wherein the second view template specifies a second arrangement of second placeholders for second graphical user interface components, wherein the second view configuration specifies the second graphical user interface components to be used as replacements for the second placeholders, and wherein the second graphical user interface components include one or more further image components, text components, or button components, and wherein the one or more processors are further configured to:
receive, from the client device, a second request;
in response to receiving the second request, retrieve second data from the persistent storage;
determine that the second data specifies that no results responsive to the second request are available;
determine that a second empty state is defined to use the second view configuration when no results responsive to the second request are available;
generate second replacement content for the second empty state, wherein the second replacement content includes the second view template with references to at least one of the second graphical user interface components of the second view configuration overwriting the second placeholders; and
transmit, in a second reply to the second request, the second replacement content.

3. The system of claim 1, wherein the persistent storage also contains a second view configuration, wherein the second view configuration specifies second graphical user interface components to be used as replacements for the placeholders, wherein the second graphical user interface components include one or more further image components, text components, or button components, and wherein the one or more processors are further configured to:
receive, from the client device, a second request;
in response to receiving the second request, retrieve second data from the persistent storage;
determine that the second data specifies that no results responsive to the second request are available;
determine that a second empty state is defined to use the second view configuration when no results responsive to the second request are available;
generate second replacement content for the second empty state, wherein the second replacement content includes the view template with references to at least one of the second graphical user interface components of the second view configuration overwriting the placeholders; and
transmit, in a second reply to the second request, the second replacement content.

4. The system of claim 1, wherein the one or more processors are further configured to:
receive, from the client device, a second request;
in response to receiving the second request, retrieve second data from the persistent storage;
determine that the second data specifies that no results responsive to the second request are available;
determine that a second empty state is defined to use the view configuration when no results responsive to the second request are available;
generate second replacement content for the second empty state, wherein the second replacement content includes the view template with references to at least one of the graphical user interface components of the view configuration overwriting the placeholders; and
transmit, in a second reply to the second request, the second replacement content.

5. The system of claim 1, wherein the arrangement of placeholders recursively defines a hierarchy of the graphical user interface components.

6. The system of claim 1, wherein the arrangement of placeholders defines relative horizontal and vertical positioning of the graphical user interface components.

7. The system of claim 1, wherein a first number of image components matches a first amount of image placeholders, wherein a second number of text components matches a second amount of text placeholders, and wherein a third number of button components matches a third amount of button placeholders.

8. The system of claim 1, wherein the request relates to content for an application containing one or more graphical user interface screens, a graphical user interface screen containing one or more segments, or a segment of a particular graphical user interface screen.

9. The system of claim 1, wherein the empty state is a default empty state that applies when no results responsive to the request are available and also applies when no results responsive to one or more other requests are available.

10. The system of claim 1, wherein the empty state is a specific empty state associated with the request that overrides any default empty state that is defined in relation to the client device.

11. The system of claim 1, further comprising:
a cache of recently-accessed content, wherein the persistent storage includes a database containing the view template and the view configuration, and wherein generating the replacement content comprises: (i) determining that the replacement content is not in the cache, (ii) obtaining the replacement content from the database, and (iii) writing the replacement content to the cache.

12. The system of claim 1, further comprising:
a cache of recently-accessed content, wherein the persistent storage includes a database containing the view template and the view configuration, and wherein generating the replacement content comprises: (i) determining that the replacement content is in the cache, and (ii) obtaining the replacement content from the cache without accessing the database.

13. A computer-implemented method comprising:

receiving, by a computing device and from a client device, a request, wherein persistent storage contains a view template and a view configuration, wherein the view template specifies an arrangement of placeholders for graphical user interface components, wherein the view configuration specifies the graphical user interface components to be used as replacements for the placeholders, and wherein the graphical user interface components include one or more image components, text components, or button components;

in response to receiving the request, retrieving, by the computing device, data from the persistent storage;

determining, by the computing device, that the data specifies that no results responsive to the request are available;

determining, by the computing device, that an empty state is defined to use the view configuration when no results responsive to the request are available;

generating, by the computing device, replacement content for the empty state, wherein the replacement content includes the view template with references to at least one of the graphical user interface components of the view configuration overwriting the placeholders; and transmitting, by the computing device and in a reply to the request, the replacement content.

14. The computer-implemented method of claim 13, wherein the arrangement of placeholders recursively defines a hierarchy of the graphical user interface components.

15. The computer-implemented method of claim 13, wherein the arrangement of placeholders defines relative horizontal and vertical positioning of the graphical user interface components.

16. The computer-implemented method of claim 13, wherein a first number of image components matches a first amount of image placeholders, wherein a second number of text components matches a second amount of text placeholders, and wherein a third number of button components matches a third amount of button placeholders.

17. The computer-implemented method of claim 13, wherein the request relates to content for an application containing one or more graphical user interface screens, a graphical user interface screen containing one or more segments, or a segment of a particular graphical user interface screen.

18. The computer-implemented method of claim 13, wherein the empty state is a default empty state that applies when no results responsive to the request are available and also applies when no results responsive to one or more other requests are available.

19. The computer-implemented method of claim 13, wherein the empty state is a specific empty state associated with the request that overrides any default empty state that is defined in relation to the client device.

20. An article of manufacture including a non-transitory computer-readable medium, having stored thereon program instructions that, upon execution by a computing system, cause the computing system to perform operations comprising:

receiving, by a computing device and from a client device, a request, wherein persistent storage contains a view template and a view configuration, wherein the view template specifies an arrangement of placeholders for graphical user interface components, wherein the view configuration specifies the graphical user interface components to be used as replacements for the placeholders, and wherein the graphical user interface components include one or more image components, text components, or button components;

in response to receiving the request, retrieving, by the computing device, data from the persistent storage;

determining, by the computing device, that the data specifies that no results responsive to the request are available;

determining, by the computing device, that an empty state is defined to use the view configuration when no results responsive to the request are available;

generating, by the computing device, replacement content for the empty state, wherein the replacement content includes the view template with references to at least one of the graphical user interface components of the view configuration overwriting the placeholders; and transmitting, by the computing device and in a reply to the request, the replacement content.

* * * * *